(12) United States Patent
Simolon et al.

(10) Patent No.: US 11,044,422 B2
(45) Date of Patent: Jun. 22, 2021

(54) PIXEL READOUT WITH PARTITIONED ANALOG-TO-DIGITAL CONVERSION SYSTEMS AND METHODS

(71) Applicant: FLIR Systems, Inc., Wilsonville, OR (US)

(72) Inventors: Brian B. Simolon, Santa Barbara, CA (US); Robert F. Cannata, Santa Barbara, CA (US); John D. Schlesselmann, Goleta, CA (US); Mark T. Nussmeier, Goleta, CA (US); Eric A. Kurth, Santa Barbara, CA (US)

(73) Assignee: FLIR SYSTEMS, INC., Wilsonville, OR (US)

( * ) Notice: Subject to any disclaimer, the term of this patent is extended or adjusted under 35 U.S.C. 154(b) by 93 days.

(21) Appl. No.: 16/505,260

(22) Filed: Jul. 8, 2019

(65) Prior Publication Data
US 2019/0335118 A1 Oct. 31, 2019

Related U.S. Application Data

(63) Continuation of application No. PCT/US2018/013629, filed on Jan. 12, 2018.
(Continued)

(51) Int. Cl.
*H04N 5/33* (2006.01)
*G01J 5/34* (2006.01)
(Continued)

(52) U.S. Cl.
CPC .................. *H04N 5/33* (2013.01); *G01J 5/34* (2013.01); *G01J 2005/0077* (2013.01); *G01J 2005/106* (2013.01)

(58) Field of Classification Search
CPC ..................................... H04N 5/33; G01J 5/34
(Continued)

(56) References Cited

U.S. PATENT DOCUMENTS 7,795,650 B2  9/2010 Eminoglu et al.
9,385,738 B2  7/2016 Kelly et al.
(Continued)

OTHER PUBLICATIONS

Schultz et al., "Digital-Pixel Focal Plane Array Technology", Lincoln Laboratory Journal, Nov. 2, 2014, vol. 20, No. 2, pp. 36-51.
(Continued)

*Primary Examiner* — Jeffery A Williams
(74) *Attorney, Agent, or Firm* — Haynes and Boone, LLP

(57) ABSTRACT

Techniques are disclosed for systems and methods for facilitating pixel readout with partitioned analog-to-digital conversion. A device includes a detector, a capacitor coupled to the detector, a counter circuit coupled to the capacitor, a reset circuit coupled to the capacitor, and a processing circuit. The detector is configured to detect electromagnetic radiation associated with a scene and generate an associated detection signal. The capacitor is configured to, during an integration period, accumulate a voltage based on the detection signal. The counter circuit is configured to, during the integration period, adjust a counter value based on a comparison of the voltage and a reference voltage. The reset circuit is configured to, during the integration period, reset the capacitor based on the comparison. The processing circuit is configured to generate a digital detector output based on the counter value when the integration period has elapsed. Related methods are also provided.

20 Claims, 20 Drawing Sheets

Related U.S. Application Data

(60) Provisional application No. 62/446,287, filed on Jan. 13, 2017, provisional application No. 62/588,878, filed on Nov. 20, 2017, provisional application No. 62/599,574, filed on Dec. 15, 2017, provisional application No. 62/745,212, filed on Oct. 12, 2018.

(51) Int. Cl.
*G01J 5/10* (2006.01)
*G01J 5/00* (2006.01)

(58) Field of Classification Search
USPC .......................................................... 348/164
See application file for complete search history.

(56) References Cited

U.S. PATENT DOCUMENTS

2006/0027730 A1    2/2006  Bamji et al.
2010/0140732 A1*   6/2010  Eminoglu .......... H01L 27/14634
                                              257/447
2017/0295333 A1*  10/2017  Boemler .............. H04N 5/3698

OTHER PUBLICATIONS

Guellec et al, "A 25μm pitch LWIR focal plane array with pixel-level 15-bit ADC providing high well capacity and targeting 2mK NETD", SPIE Infared Technology and Applications XXXVI, Apr. 2010, vol. 7660, 76603T-1 to 76603T-9.

Abbasi et al, "A PFM based digital pixel with off-pixel residue measurement for 15μm pitch MWIR FPAs", Proc. SPIE 9819, Infrared Technology and Applications XLII, 981929, May 20, 2016.

* cited by examiner

PIXEL READOUT WITH PARTITIONED ANALOG-TO-DIGITAL CONVERSION SYSTEMS AND METHODS

CROSS-REFERENCE TO RELATED APPLICATIONS

This application is a continuation of International Patent Application No. PCT/US2018/013629 filed Jan. 12, 2018 and entitled "PIXEL READOUT WITH PARTITIONED ANALOG-TO-DIGITAL CONVERSION SYSTEMS AND METHODS," which is incorporated herein by reference in its entirety.

International Patent Application No. PCT/US2018/013629 filed Jan. 12, 2018 claims the benefit of and priority to U.S. Provisional Application No. 62/446,287 filed Jan. 13, 2017 and entitled "SYSTEMS AND METHODS FOR PIXEL READOUT WITH PARTITIONED ANALOG-TO-DIGITAL CONVERSION," U.S. Provisional Application No. 62/588,878 filed Nov. 20, 2017 and entitled "PIXEL READOUT WITH COUNTER VALUE LOOPBACK MITIGATION SYSTEMS AND METHODS," and U.S. Provisional Application No. 62/599,574 filed Dec. 15, 2017 and entitled "PIXEL READOUT WITH NOISE REDUCTION MITIGATION SYSTEMS AND METHODS," all of which are incorporated herein by reference in their entirety.

This application also claims the benefit of and priority to U.S. Provisional Application No. 62/745,212 filed Oct. 12, 2018 and entitled "PIXEL READOUT WITH COUNTER VALUE LOOPBACK MITIGATION SYSTEMS AND METHODS," which is incorporated herein by reference in its entirety.

TECHNICAL FIELD

One or more embodiments relate generally to detection devices and more particularly, for example, to pixel readout with partitioned analog-to-digital conversion systems and methods.

BACKGROUND

Finer granularity in generating a digital representation indicative of a magnitude of a detected signal may be associated with higher power dissipation. In some cases, the power dissipation associated with generating the digital representation may be dependent on the magnitude of the detected signal. Furthermore, the finer granularity may be detrimentally affected by noise.

SUMMARY

In one or more embodiments, a method includes, during an integration period, accumulating, by a first capacitor, a first voltage based on electromagnetic radiation received by a detector. The method further includes, during the integration period, adjusting a counter value when the first voltage exceeds a reference value. The method further includes, during the integration period, resetting the first voltage when the first voltage exceeds the reference value. The method further includes, during the integration period, repeating the accumulating, adjusting, and resetting until the integration period has elapsed. The method further includes determining a residual voltage on the first capacitor when the integration period has elapsed. The method further includes maintaining the residual voltage on a second capacitor. The method further includes generating a digital detector output based on the counter value and the residual voltage.

In one or more embodiments, a device includes a detector configured to detect electromagnetic radiation and generate a detection signal based on the detected electromagnetic radiation. The device further includes a first capacitor coupled to the detector. The first capacitor is configured to, during an integration period, accumulate a first voltage based on the detection signal. The device further includes a counter circuit coupled to the first capacitor. The counter circuit is configured to, during the integration period, adjust a counter value based on a comparison of the first voltage and a reference voltage. The device further includes a first reset circuit coupled to the first capacitor. The first reset circuit is configured to, during the integration period, reset the first capacitor based on the comparison. The device further includes a second capacitor configured to receive a residual voltage on the first capacitor when the integration period has elapsed. The device further includes a processing circuit configured to generate a digital detector output based on the counter value and the residual voltage.

In one or more embodiments, a method includes generating a respective first counter value for each of a plurality of active unit cells in response to an incident scene. The method further includes generating a respective second counter value for each of a plurality of reference unit cells. The method further includes determining a buffer zone based on the second counter values. The method further includes identifying a subset of the first counter values based on the buffer zone. The method further includes identifying a remainder of the first counter values. The method further includes adjusting each of the first counter values in the subset using a predetermined value to obtain adjusted first counter values. The method further includes generating reconstructed image data associated with the incident scene based at least on the adjusted first counter values and the remainder of the first counter values.

In one or more embodiments, a device includes a plurality of active unit cells, where each active unit cell includes a detector configured to generate an output in response an incident scene. The device further includes a plurality of reference unit cells, wherein each reference unit cell includes a detector configured to generate an output. The device further includes a processor circuit configured to generate, for each of the plurality of active unit cells, a respective first counter value based on the respective output of the active unit cell. The processor is further configured to generate, for each of the plurality of reference unit cells, a respective second counter value based on the respective output of the reference unit cell. The processor is further configured to determine a buffer zone based on the second counter values. The processor is further configured to identify, based on the buffer zone, a subset of the first counter values. The processor is further configured to identify a remainder of the first counter values. The processor is further configured to adjust each of the first counter values in the subset using a predetermined value to obtain adjusted first counter values. The processor is further configured to generate reconstructed image data associated with the incident scene based at least on the adjusted first counter values and the remainder of the first counter values.

In one or more embodiments, a device includes a detector configured to detect electromagnetic radiation and generate a detection signal based on the detected electromagnetic radiation. The device further includes a first capacitor coupled to the detector, where the first capacitor is configured to, during an integration period, accumulate a first voltage based on the detection signal. The device further includes a counter circuit coupled to the first capacitor, where the counter circuit is configured to, during the integration period, adjust a counter value based on a comparison of the first voltage and a reference voltage. The device further includes a reset circuit coupled to the first capacitor, where the reset circuit is configured to, during the integration period, reset the first capacitor based on the comparison. The device further includes a processing circuit configured to generate a digital detector output based on at least on the counter value when the integration period has elapsed.

In one or more embodiments, a method includes, during an integration period, accumulating, by a first capacitor, a first voltage based on electromagnetic radiation received by a detector; comparing, by a comparator, the first voltage to a reference voltage; adjusting, by a counter circuit, a counter value when the first voltage exceeds the reference voltage; resetting the first voltage when the first voltage exceeds the reference voltage; and repeating the accumulating, comparing, adjusting, and resetting until the integration period has elapsed. The method further includes generating a digital detector output based on the counter value when the integration period has elapsed.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Figure 1A:
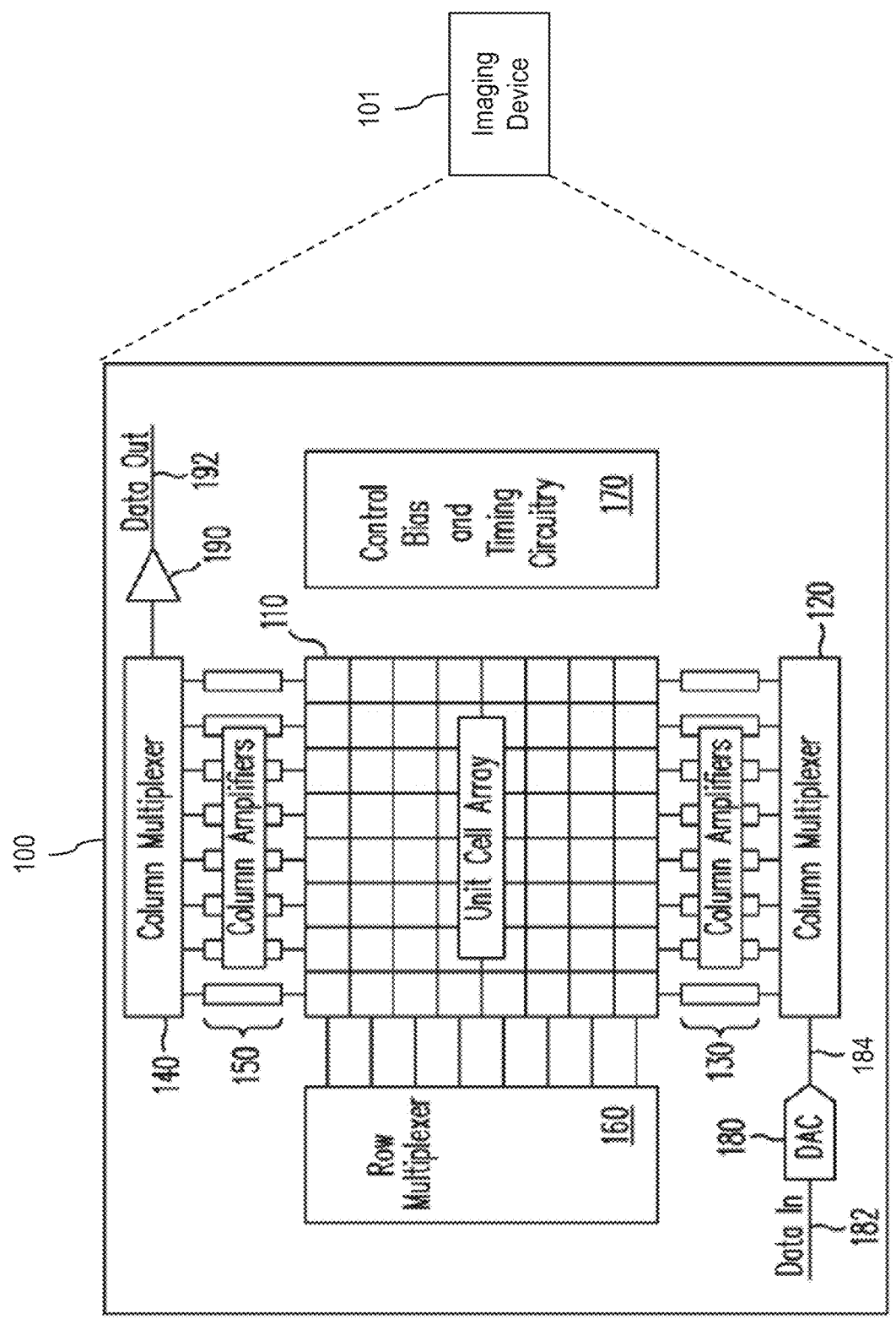
FIG. 1A illustrates a high level block diagram of an example of a focal plane array in accordance with an embodiment of the present disclosure.

FIG. 1A illustrates a high level block diagram of a focal plane array (FPA) 100 in accordance with an embodiment of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The FPA 100 includes a unit cell array 110, column multiplexers 120 and 140, column amplifiers 130 and 150, a row multiplexer 160, control bias and timing circuitry 170, a digital-to-analog converter (DAC) 180, and a data output buffer 190. The unit cell array 110 includes an array of unit cells. In an aspect, each unit cell may include a detector and interface circuitry. The detector may receive electromagnetic radiation (EM) and provide a detector signal (e.g., charge, current, voltage, or other types of signals) in response to the received EM radiation. In an aspect, the EM radiation may be received within an integration time (also referred to as integration period). The integration time may be, or may be indicative of, a time interval that begins at a time of collecting (e.g., trapping and retaining) the EM radiation by the detectors of the unit cells and ends at a time of reading out the collected EM radiation. EM radiation may generally refer to any radiation in the EM spectrum and may be referred to as an EM beam of radiation, EM beam, light, beam, or variant thereof (e.g., EM beam of light). The term light may include visible light, infrared light, ultraviolet light, or generally any portion of the EM spectrum.

The interface circuitry of each unit cell may provide an output signal, such as an output voltage or current, in response to the detector signal provided by the detector of the unit cell. The output signal may be indicative of the magnitude of the EM radiation received by the detector. The column multiplexer 140, column amplifiers 150, row multiplexer 160, and data output buffer 190 may be used to provide the output signals from the unit cell array 110 as a data output signal on a data output line 192. The data output signal may be an image formed of the pixel values for the FPA 100. In this regard, the column multiplexer 140, column amplifiers 150, row multiplexer 160, and data output buffer 190 may collectively provide a readout integrated circuit (ROIC) of the FPA 100.

In an aspect, the column amplifiers 150 may generally represent any column processing circuitry as appropriate for a given application (analog and/or digital), and is not limited to amplifier circuitry for analog signals. In this regard, the column amplifiers 150 may more generally be referred to as column processors in such an aspect. Signals received by the column amplifiers 150, such as analog signals on an analog bus and/or digital signals on a digital bus, may be processed according to the analog or digital nature of the signal. As an example, the column amplifiers 150 may include circuitry for processing digital signals.

As another example, the column amplifiers 150 may be a path (e.g., no processing) through which digital signals from the unit cell array traverses to get to the column multiplexer 140. As another example, the column amplifiers 150 may include an ADC for converting analog signals to digital signals. These digital signals may be provided to the column multiplexer 140.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 170 may generate the bias signals and provide them to the unit cells. By providing appropriate bias signals to each unit cell, the unit cell array 110 may be effectively calibrated to provide accurate image data in response to light (e.g., infrared light) incident on the detectors of the unit cells.

In an aspect, the control bias and timing circuitry 170 may generate bias values and timing control voltages. In some cases, the DAC 180 may convert the bias values received as, or as part of, data input signal on a data input signal line 182 into bias signals (e.g., analog signals on analog signal line(s) 184) that may be provided to individual unit cells through the operation of the column multiplexer 120, column amplifiers 130, and row multiplexer 160. For example, the analog signals on the analog signal line(s) 184 may be utilized to set reference voltages for each unit cell of the unit cell array 110. Different unit cells may have different reference voltages. In another aspect, the control bias and timing circuitry 170 may generate the bias signals (e.g., analog signals) and provide the bias signals to the unit cells without utilizing the DAC 180. In this regard, some implementations do not include the DAC 180, data input signal line 182, and/or analog signal line(s) 184.

In an aspect, as shown in FIG. 1A, the FPA 100 may be implemented as part of an imaging device 101. In addition to the various components of the FPA 100, the imaging device 101 may also include one or more processors, memories, logic, displays, interfaces, lenses, and/or other components as may be appropriate in various implementations. In an aspect, the data output signal on the data output line 192 may be provided to the processors (not shown) for further processing. For example, the data output signal may be an image formed of the pixel values from the unit cells of the FPA 100. The processors may perform operations such as non-uniformity correction (NUC), spatial and/or temporal filtering, and/or other operations. The images (e.g., processed images) may be stored in memory (e.g., external to or local to the imaging device 101) and/or displayed on a display device (e.g., external to and/or integrated with the imaging device 101).

In an aspect, the imaging device 101 may be, may include, or may be a part of, an infrared (IR) imaging device (e.g., IR camera). The IR imaging device may capture (e.g., detect, sense) IR radiation with wavelengths in the range from around 700 nm to around 1 mm, or portion thereof. For example, in some aspects, the IR image capture circuit 105 may be sensitive to (e.g., better detect) mid-wave IR (MWIR) radiation (e.g., electromagnetic radiation with wavelength of 2-5 µm) and/or long-wave IR (LWIR) radiation (e.g., electromagnetic radiation with wavelength of 7-14 µm). By way of non-limiting example, the array size of the FPA 100 may be 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In some aspects, a larger array size may be associated with a lower frame rate.

Figure 1B:
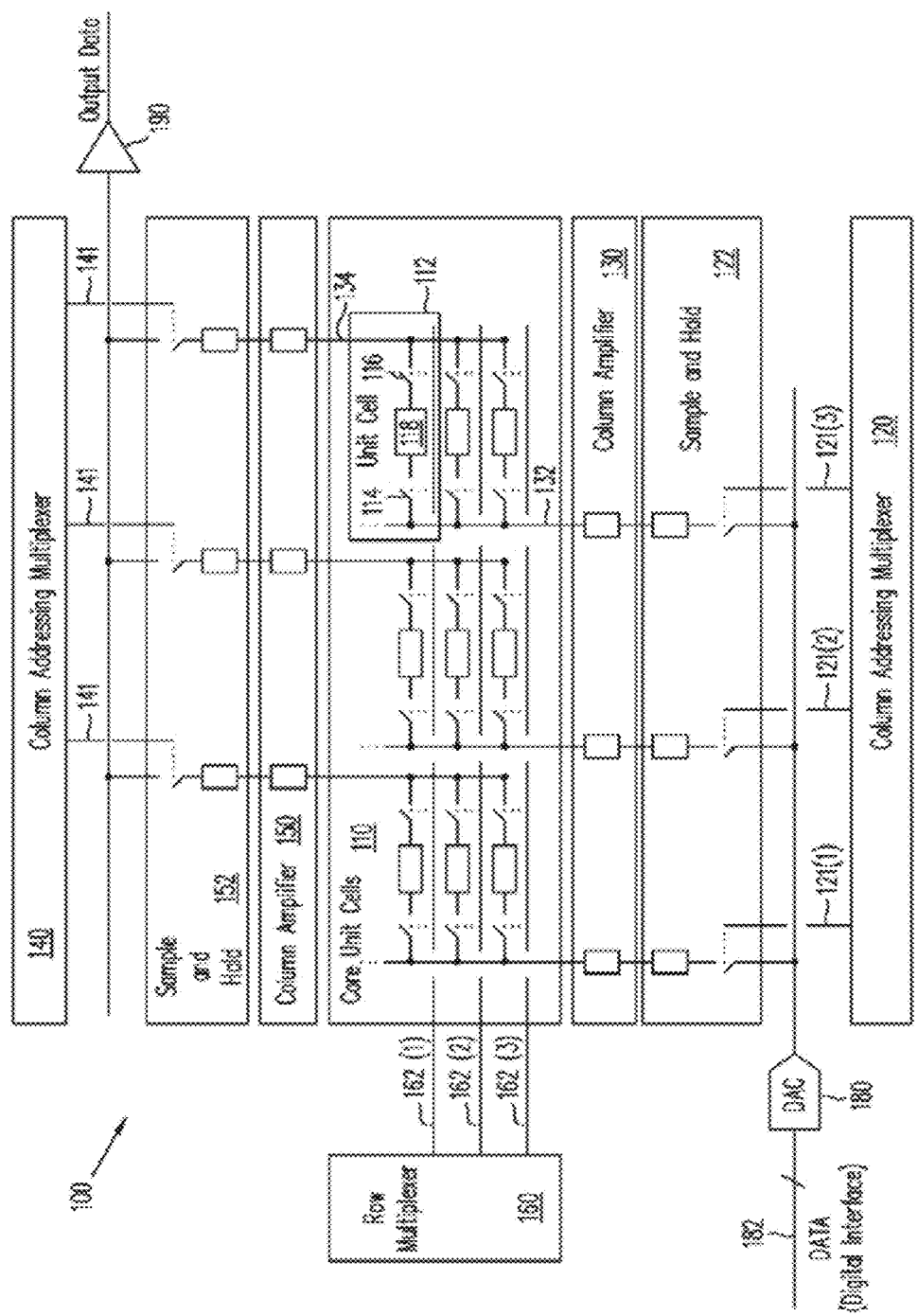
FIG. 1B illustrates an example of a detailed block diagram of the focal plane array of FIG. 1A in accordance with an embodiment of the present disclosure.

FIG. 1B illustrates an example of a detailed block diagram of the FPA 100 in accordance with an embodiment of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. The description of FIG. 1A generally applies to FIG. 1B, with examples of differences and other description provided herein for purposes of clarity and simplicity.

In addition to various components shown in FIG. 1A, FIG. 1B illustrates column enable lines 121 and 141, sample and hold circuitry 122 and 152, column input lines 132, column output lines 134, and row enable lines 162. The column addressing multiplexer 120 may operate the sample and hold circuitry 122 through the column enable lines 121 to selectively provide bias voltages from the DAC 180 to one or more columns of the unit cell array 110 through the column amplifiers 130 and column input lines 132.

As shown in FIG. 1B, each unit cell 112 of the unit cell array 110 may include an input switch 114, an output switch 116, and a main circuit 118. The main circuit 118 may include a detector and one or more capacitors. The input switches 114 may be selectively closed by the row multiplexer 160 through the row enable lines 162 to provide bias voltages from the column input lines 132 to the main circuits 118. For example, the bias voltages may be provided to one or more capacitors of the main circuits 118. The input switches 114 may be selectively opened to isolate the main circuits 118 from the column input lines 132, e.g. after the bias voltages are stored by one or more capacitors of the main circuits 118. As a result, the main circuits 118 may be effectively decoupled from the column input lines 132 (e.g., decoupled from bias voltage supply circuitry) and thus may remain relatively noise free while the unit cell array 110 detects one or more image frames during one or more integration periods.

In some embodiments, the bias voltages are not required to be provided anew to each unit cell 112 for each image frame. Instead, the bias voltages may be retained by each unit cell 112 (e.g., stored on one or more capacitors of each unit cell 112) over many integration periods (e.g., ranging from several to hundreds or even thousands of integration periods in various embodiments). In another embodiment, the bias voltages may be provided to each unit cell 112 for each image frame (e.g., for each integration period).

As discussed, the unit cells 112 may provide output signals in response to EM radiation (e.g., IR light) received by the detectors. The output switches 116 may be selectively closed by the row multiplexer 160 through the row enable lines 162 to provide the output signals, such as output voltages or currents from the main circuits 118 to the column output lines 134. In one embodiment, the input switches 114 and output switches 116 may be operated independently by the different row enable lines 162. In another embodiment, the input switches 114 and output switches 116 may be operated substantially simultaneously by shared row enable lines 162. The column addressing multiplexer 140 may operate the sample and hold circuitry 152 through the column enable lines 141 to selectively provide output signals from the column output lines 134 to the data output buffer 190.

In one embodiment, the column multiplexer 120 and row multiplexer 160 may be used to load bias voltages into unit cells 112. For example, bias voltages associated with a row of unit cells 112 may be sampled by the sample and hold circuitry 122 in response to column enable signals provided over the column enable lines 121, and then loaded into a desired row of unit cells in response to row enable signals provided over the row enable lines 162. Subsequently, the next set of bias voltages associated with a next row of unit cells 112 may be sampled by the sample and hold circuitry 122 and then loaded into the next row of unit cells 112. This process may continue until bias voltages have been provided to all unit cells 112 to complete an entire frame.

In one embodiment, each unit cell 112 may be configured to selectively isolate its bias voltage from other portions of the unit cell 112 until an integration (e.g., a light detection operation) is performed by the main circuits 118. For example, each unit cell 112 may initially store the bias signal received from a connected column input line 132 on a capacitor that remains disconnected from the detector of the main circuit 118 while other bias signal are loaded into other unit cells 112. Prior to an integration period, the capacitors of all unit cells 112 may be connected substantially simultaneously to one or more other capacitors and/or the detectors of such unit cells 112 by closing appropriate switches of the unit cells.

Figure 2:
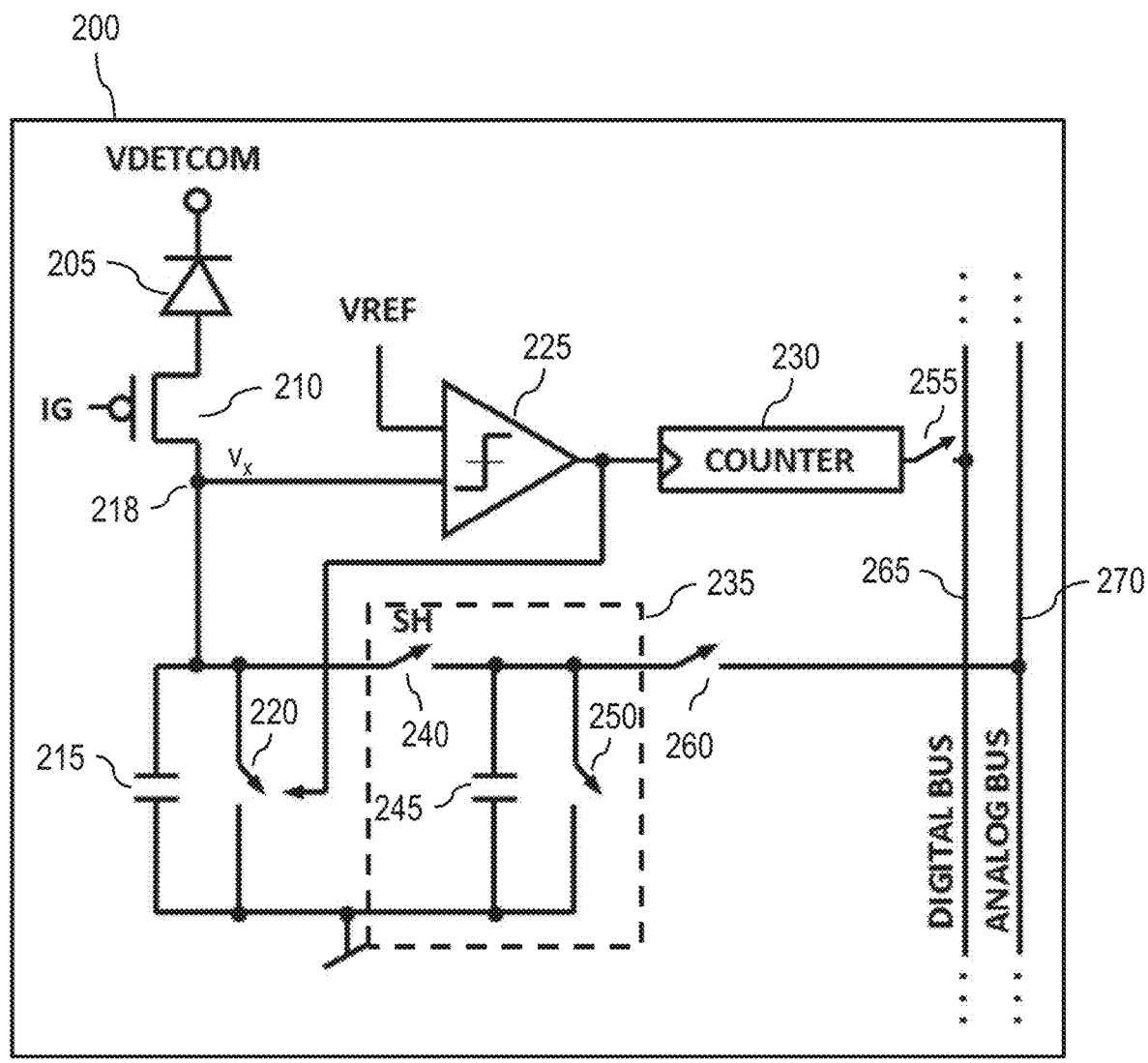
FIG. 2 illustrates an example of a unit cell in accordance with an embodiment of the present disclosure.

FIG. 2 illustrates an example of a unit cell 200 in accordance with an embodiment of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The unit cell 200 includes a detector 205, a transistor 210, a capacitor 215, a switch 220, a comparator 225, and a counter circuit 230. By way of non-limiting example, the detector 205 may be a photodetector (e.g., avalanche photodiode, infrared photodetector, quantum well infrared photodetector), a bolometer (e.g., microbolometer), or other detector capable of converting EM radiation (e.g., of a certain wavelength) to a detector signal (e.g., detector current). The detector 205 is connected to a detector voltage supply, denoted as $V_{DETCOM}$, and the transistor 210. The detector 205 may generate a detector signal (e.g., detector current) based on captured EM radiation. A bias signal (e.g., a bias voltage $I_G$) may be applied to the transistor 210 (e.g., a gate of the transistor 210) and may allow the transistor 210 to provide the detector signal from the detector 205 to the capacitor 215 based on EM radiation (e.g., IR light) incident on the detector 205 during an integration period. For example, the detector signal may be provided to the capacitor 215 by direct injection. In an aspect, the bias signal may be provided by the control bias and timing circuitry 170 shown in FIG. 1A.

A voltage $v_x$ at a node 218 between the transistor 210 and the capacitor 215 increases in magnitude as the detector signal (e.g., detector current) is provided to and integrated by the capacitor 215. In an aspect, the voltage $v_x$ may be referred to as an integration voltage and the node 218 may be referred to as an integration node. In this regard, the voltage $v_x$ may be a voltage ramp whose slope is proportional to the magnitude of the detector signal. The magnitude of the detector signal is proportional to the magnitude of the EM radiation captured by the detector 205. The comparator 225 compares the voltage $v_x$ with a reference voltage $V_{REF}$. In an aspect, analog signals on the analog signal line(s) 184 shown in FIG. 1A may allow setting of a different $V_{REF}$ for different unit cells. For example, the reference voltage $V_{REF}$ for the unit cell 200 may be different from a reference voltage $V_{REF}$ of another unit cell. In an aspect, the reference voltage $V_{REF}$ may be, or may be referred to as, a controllable voltage threshold level or a per-pixel reference voltage. As an example, the reference voltage $V_{REF}$ may be between 1.5 V and 2.5 V.

When the voltage $v_x$ exceeds the reference voltage $V_{REF}$ (e.g., in magnitude), the comparator 225 may generate one or more outputs to increment a counter value and cause reset of the capacitor 215. In this regard, an output of the comparator 225 may cause the counter circuit 230 to increment a counter value. An output of the comparator 225 may cause the switch 220 to be closed and cause the capacitor 215 to discharge. In some cases, a single output may be routed to both the switch 220 and the counter circuit 230. In an aspect, additional circuitry may be provided along the path between the comparator 225 and the switch 220. For example, buffers (e.g., non-inverting buffers, inverters) may be provided to appropriately buffer control signals provided by the comparator 225 to the switch 220. The use of such buffers may facilitate appropriate timing associated with integrating at the capacitor 215 and resetting of the capacitor 215.

In an aspect, the comparator 225 may generate an output signal of a logic level '0' when the voltage $v_x$ does not exceed the reference voltage $V_{REF}$. For example, the comparator 225 may include or may be coupled to a 1-bit analog-to-digital converter (ADC) that generates the output signal of the logic level '0'. At a moment when the voltage $v_x$ exceeds the reference voltage $V_{REF}$, the 1-bit ADC may transition its output signal from a logic level '0' to a logic level '1' to cause the counter circuit 230 to increment the counter value and the switch 220 to be closed to reset the capacitor 215. In this regard, the comparator 225 may generate a digital output or may generate an analog output that can be converted (e.g., via a 1-bit ADC) to a digital value (e.g., 0 or 1). Once the capacitor 215 is reset (e.g., cleared of voltage), the switch 220 may be opened and another cycle of the conversion process (e.g., integration of detector signal by the capacitor 215, incrementing the counter value by the counter circuit 230, and resetting the capacitor 215) may be performed. Conversion cycles may be performed for the duration of the integration period. In this regard, an output of the counter circuit 230 is a counter value (e.g., representable using bits) indicative of a portion of the magnitude of the detector signal. In an aspect, during the conversion cycles, a switch 240 may be opened (e.g., in an off state) to allow integration of the detector signal by the capacitor 215. In an aspect, the switch 220 may be considered a reset circuit that resets the capacitor 215.

When a switch 255 is closed, the counter value of the counter circuit 230 at the end of the integration period may be provided to a digital bus 265 to be read by column circuitry (e.g., 140, 150, and/or 152 in FIGS. 1A and 1B). For example, the switch 255 may be closed when a row of the unit cell array (e.g., 110) that includes the unit cell 200 is being read out. The switch 255 may be referred to as a row-select switch, a readout switch, or a row-readout switch. In an aspect, the counter value may be held (e.g., buffered) until the time of read out. In some cases, the digital bus 265 may provide the counter value to the column multiplexer 140 without any intervening processing. For example, the counter value may bypass the column amplifiers 150 or pass through the column amplifiers 150 without any processing. In other cases, the column amplifiers 150 may process the counter value (e.g., to facilitate combining the counter value with the digital output associated with the residual voltage).

At the end of the integration period, the voltage $v_x$ at the node 218 may be indicative of a charge remaining on the capacitor 215 and is at a voltage less than the reference voltage $V_{REF}$. Such a remaining voltage may be referred to as a residual voltage. In this regard, the residual voltage is the voltage $v_x$ captured during the integration period that does not exceed the reference voltage $V_{REF}$ and, thus, the residual voltage is not large enough to cause the counter value to be incremented by the counter circuit 230. In an aspect, the residual voltage is indicative of a portion of the magnitude of the detector signal not encompassed by the counter value.

The residual voltage may be sampled and held using the sample, hold, and reset circuitry 235. The sample, hold, and reset circuitry 235 includes the switch 240, a capacitor 245, and a switch 250. The switch 240 may be closed (e.g., in an on state) at the end of the integration period to allow the residual voltage from the capacitor 215 to be sampled and held by the sample, hold, and reset circuitry 235. In this regard, the switch 240 may be referred to as a sample-hold switch and the capacitor 245 may be referred to as a sample-hold capacitor. In an aspect, the residual voltage may be held until a switch 260 is closed. For example, the switch 260 may be closed when a row of the unit cell array (e.g., 110) that includes the unit cell 200 is being read out. When the switch 260 is closed, the residual voltage may be provided to an analog bus 270 to be read by column circuitry (e.g., 140, 150, and/or 152 in FIGS. 1A and 1B). The switch 260 may be referred to as a row-select switch, a readout switch, or a row-readout switch. In an aspect, the column circuitry may process the residual voltage, such as digitizing (e.g., digital conversion using an ADC) the residual voltage to a corresponding digital value. Once the residual voltage has been read out, the switch 250 may be closed to reset the capacitor 245.

In an aspect, the various switches 240, 250, 255, and/or 260 may be controlled by control signals provided by a control bias and timing circuitry (e.g., 170 in FIG. 1A). For example, the control signals may allow the capacitor 215 to be integrating a detector signal while the residual voltage is being read out from the sample, hold, and reset circuitry 235 to the analog bus 270. Such an aspect may be referred to as integrate-while-read. Such an aspect may improve the efficiency of the unit cell 200, since the EM radiation may continually be detected and integrated, compared to a case in which the detector signal is not being integrated during a time that the residual voltage is being read out of each unit cell row-by-row. The row-select may turn off (e.g., set the switch 260 to an off state) for the particular row and will turn on for the next row. A row time may refer to the time utilized to read out each column for a given row.

Once the residual voltage is converted to a digital output corresponding to the residual voltage, the counter value may be combined with the digital output to form a combined digital output (e.g., as part of the data output signal on the data output line 192). In an aspect, the combined digital output may form a portion (e.g., a pixel) of an image (e.g., IR image) generated based on EM radiation captured by the unit cell 200. In some cases, the digital output corresponding to the residual output and/or the counter value may be processed (e.g., calibrated, scaled, aligned) so that they may be combined to form a combined digital output indicative of the magnitude of the detector signal captured during the integration period. Such processing may be performed on-chip and/or off-chip.

In an aspect, the counter value may form, or may be processed to form, higher order bits (e.g., most significant bits) of the detector signal while the digital output associated with the residual voltage may form, or may be processed to form, lower order bits (e.g., least significant bits) of the detector signal. In this regard, a resolution associated with the counter value may be based on the least significant bit of the counter value, since the least significant bit is associated with the threshold value for the voltage $v_x$ that causes the counter value to be incremented. As shown in FIG. 2, the reference voltage $V_{REF}$ may be utilized as a threshold for comparison with the voltage $v_x$. Fine tuning of this resolution may be provided by the lower order bits obtained from the residual voltage.

In an aspect, the counter value provided on the digital bus 265 may be multiplexed separately from the digital output corresponding to the residual voltage on the analog bus 270. For example, the digital output may be multiplexed and converted (e.g., on-chip or off-chip) and later combined with the counter value. In another aspect, the counter value and the digital output may be multiplexed together. In such a case, the bits of the counter value and the bits generated from the residual voltage may need to be separated and processed separately (e.g., scaled, calibrated) prior to being combined together to form a combined digital output (e.g., as part of the data output signal on the data output line 192). The counter value of the counter circuit 230 may be reset (e.g., set to 0) once the counter value has been provided to the digital bus 265. The counter value may then be incremented during a next integration period.

In an aspect, the unit cell 200 may be, may include, or may be a part of, the main circuit 118 shown in FIG. 1B. The unit cell 200 may be, may be part of, and/or may be referred to as a pixel of the FPA 100. The unit cell 200 may be selectively connected to a column input line (e.g., 132) through a switch (e.g., 114), and/or a column output line (e.g., 134) through a switch (e.g., 116). In operation, the switch 114 may initially be open. In one embodiment, the switch 116 may also initially be open. In another embodiment, the switch 116 may initially be closed (e.g., to permit the readout of a data value detected by the unit cell 200). In an aspect, the voltage $V_{DETCOM}$, voltage $V_{REF}$, and/or current $I_G$ may be applied to all unit cells in the unit cell array 110. Based on context, a pixel may refer to a detector (e.g., 205) that generates an associated pixel value or a pixel (e.g., pixel location, pixel coordinate) of an image formed from the generated pixel values. In some cases, a pixel may refer to a unit cell (e.g., 200) or portion thereof, or the unit cell together with circuitry associated with the unit cell. Components within the unit cell may be referred to as in-pixel. For example, the comparator 225 may be referred to as an in-pixel comparator. In some cases, a comparator (e.g., 225) may be, may be utilized as, or may be referred to as, an amplifier, or vice versa.

With reference to FIGS. 1A, 1B, and 2, the switch 114 may be closed (e.g., in response to one of the row enable signals on the row enable lines 162) to couple a bias signal (e.g., bias voltage, bias current) from one of the column input lines 132 to the transistor 210 of the unit cell 200. Other manners by which to drive the transistor 210 or otherwise provide a bias signal to the transistor 210 (e.g., during the integration period) may be utilized. For example, one or more switches and/or one or more capacitors may be present between the switch 114 and the gate of the transistor 210. The unit cell 200 may be selectively connected to one of the column output lines 134 through the output switch 116 (e.g., in response to one of the row enable signals on the row enable lines 162) to provide output values (e.g., counter value, residual voltage or digitized representation thereof). In an aspect, the switches 255 and 260 may be represented by the output switch 116 in FIG. 1B. In an aspect, a buffer may be placed between the sample, hold, and reset circuitry 235 and the switch 260, e.g. to isolate the residual voltage from components that follow the buffer (e.g., the switch 260, column circuitry, etc.).

In an aspect, the counter circuit 230 may be an 8-bit counter circuit for generating an 8 bit representation of voltages from the capacitor 215. For example, the output of the 8-bit counter circuit may be between 0 (e.g., "00000000") and 255 (e.g., "11111111"), inclusive, with the counter value being incremented by one each time the voltage $v_x$ at the node 218 exceeds the reference voltage $V_{REF}$. The 8 bit output of the 8-bit counter circuit may be provided to the digital bus 265 for reading by column circuitry. In an aspect, the analog bus 270 may route the residual voltage to an 8-bit ADC (e.g., part of column circuitry) that generates an 8 bit representation of the residual voltage. The conversion may utilize single-slope conversion, or generally any other conversion technique.

In a case where the counter circuit 230 generates an 8 bit counter value and the residual voltage is converted to an 8 bit value, the pair of 8 bit outputs may be combined into a 16 bit output indicative of the combination of the voltages from the capacitor 215 and the residual voltage from the capacitor 245. In this example, the 8 bit counter value may provide the higher order bits and the 8 bit result from the column circuitry associated with the residual voltage may provide the lower order bits. In this regard, the residual voltage may have a magnitude less than the reference voltage $V_{REF}$.

In an embodiment, to facilitate the combination of the counter value from the counter circuit 230 and the digital output corresponding to the residual voltage, the counter value and/or the digital output corresponding to the residual output may be processed (e.g., calibrated, scaled, aligned) so that they may be combined to form a combined digital output indicative of the magnitude of the detector signal captured during the integration period. In this regard, the magnitude of the detector signal includes the magnitude as represented by the counter value and the magnitude as provided by the residual voltage. In an aspect, once the processing and/or calibration is performed, a voltage associated with the least significant bit of the 8 bit counter value (e.g., processed counter value) may be 256 times larger than the least significant bit of the 8 bit digital output associated with the residual voltage.

In some cases, an additional bit(s) (e.g., overlap bit(s)) may be utilized. For example, an additional bit may be utilized to represent the residual voltage. The combined digital output may include the bits associated with the counter value followed by the additional bit, and the digital output corresponding to the residual voltage may follow the additional bit. In this example, the additional bit may be considered a most significant bit of the digital output corresponding to the residual voltage. The additional bit may be utilized to align the counter value with the digital output corresponding to the residual output to allow appropriate combination of the counter value with the digital output.

Although the foregoing discussion is made in a case of an 8 bit counter value and an 8 bit digital value corresponding to the residual voltage, the number of bits for each of these digital values may be different from 8 bits and/or may be different from each other. As an example, a 4 bit counter value may be used (e.g., combined) with a 4 bit digital value corresponding to the residual voltage. As another example, a 6 bit counter value may be used with a 10 bit digital value corresponding to the residual voltage.

Figure 3:
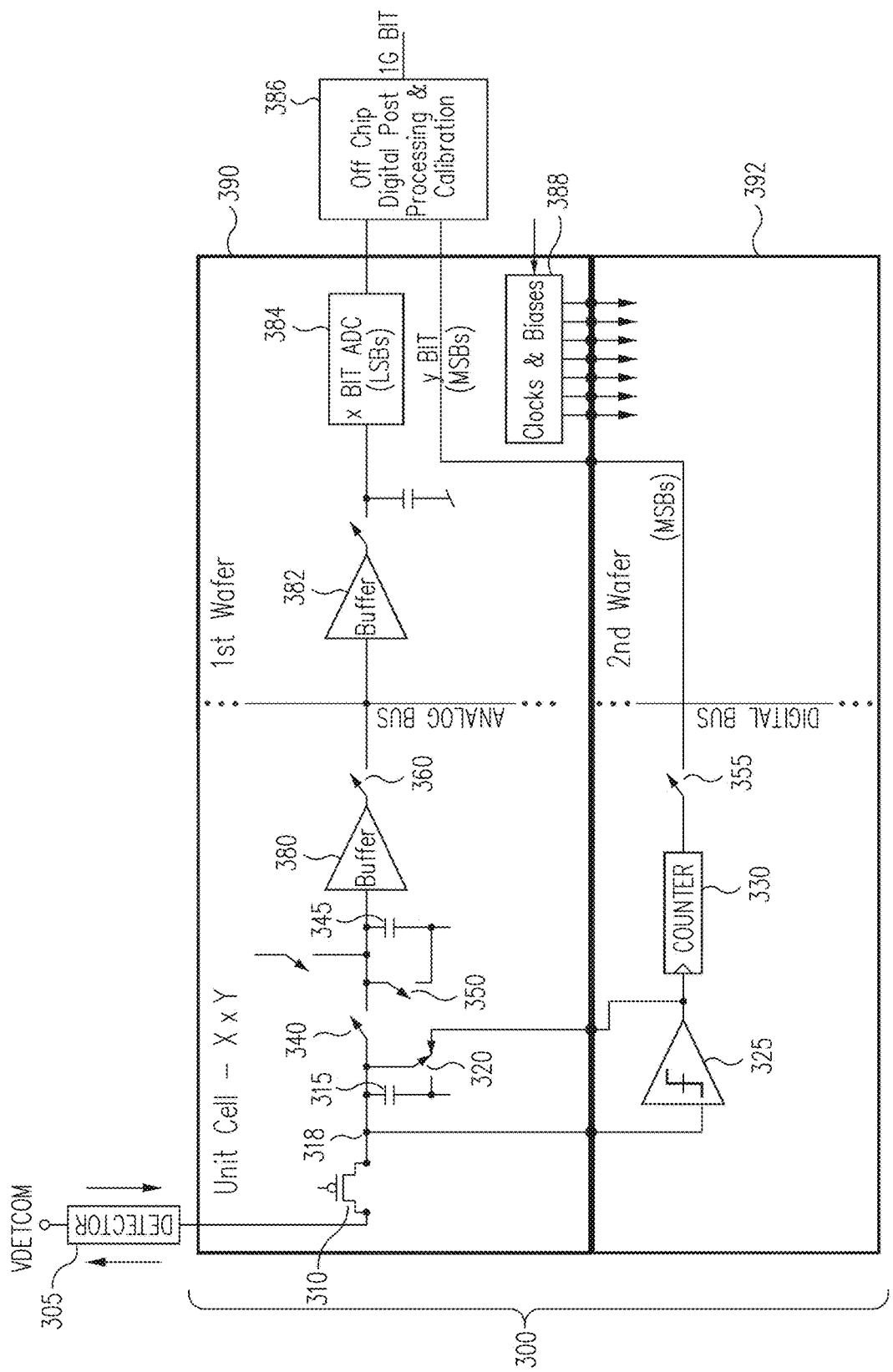
FIG. 3 illustrates an example of a unit cell and associated circuitry in accordance with an embodiment of the present disclosure.

FIG. 3 illustrates an example of a unit cell 300 and associated circuitry in accordance with an embodiment of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The description of FIG. 2 generally applies to FIG. 3, with examples of differences and other description provided herein for purposes of clarity and simplicity. In this regard, in an aspect, the description of the detector 205, transistor 210, capacitor 215, node 218, switch 220, comparator 225, counter circuit 230, switch 240, capacitor 245, switch 250, switch 255, and switch 260 shown in FIG. 2 generally applies to a detector 305, transistor 310, capacitor 315, node 318, switch 320, comparator 325, counter circuit 330, switch 340, capacitor 345, switch 350, switch 355, and switch 360, respectively, shown in FIG. 3. The transistor 310 may be utilized to pass a detector signal from the detector 305 to the capacitor 315. In some cases, the transistor 310 may have a bias gate that is configured as a direct injection input circuit to set a voltage bias across the detector 305. The comparator 325 may compare a voltage $v_x$ at the node 318 with a reference voltage $V_{REF}$ to determine whether to cause the counter circuit 330 to increment the counter value.

A buffer 380 may be utilized to isolate the residual voltage until the switch 360 is closed to allow read out of the residual voltage. In this regard, the buffer 380 may isolate the capacitor 345 from circuitry that follow the buffer 380 (e.g., components 360, 382, 384, etc.). For example, the buffer 380 may be, or may include, an analog voltage buffer with a source follower topology. The residual voltage may be read out and isolated by a buffer 382 until time to be converted to a digital signal by an ADC 384. An off-chip digital post processing and calibration circuit 386 may process the counter value from the counter circuit 330 and/or the digital output of the ADC 384 and combine the counter value (e.g., processed counter value) with the digital output (e.g., processed digital value) to form a combined digital output (e.g., as part of the data output signal on the data output line 192). In some cases, the digital post processing and/or calibration may be performed on-chip and/or off-chip. A clock and bias circuitry 388 may provide timing and/or biasing signals to the various components shown in FIG. 3. In some cases, the clock and bias circuitry 388 may derive (or simply pass) the timing and/or biasing signals from signals received from the control bias and timing circuitry 170.

In an aspect, the unit cell 300 may be implemented on a first wafer 390 and a second wafer 392. The first wafer 390 may include components associated with integrating the detector signal from the detector 305, obtaining the residual voltage, and generating a digital representation of the residual voltage. The second wafer 392 may include components associated with generating the counter value. In an aspect, the wafers 390 and 392 may be fabricated in two separate complementary metal-oxide-semiconductor (CMOS) processes. The wafers may be fabricated in the same or in different CMOS process nodes, such as the 65 nm, 90 nm, 130 nm, or 180 nm nodes. The wafers 390 and 392 may be interconnected via intra-chip connections. In an aspect, the wafer 390 may be referred to as an analog wafer or analog portion, and the wafer 392 may be referred to as a digital wafer or digital portion.

Although FIG. 3 illustrates an example implementation in which the analog portion and the digital portion are each implemented on its own wafer, in some cases, one or both of the analog and digital portions may be implemented using multiple wafers. In other cases, the analog and digital portions may both be on the same wafer. In an aspect, the detector 305 may be considered to be part of the unit cell 300. For example, the detector 305 may be separate from the first wafer 390 and the second wafer 392. In some cases, the unit cell 300 may include the detector 305, a portion of the first wafer 390, and/or a portion of the second wafer 392. In these cases, as an example, the buffer 382, ADC 384, and/or clock and bias circuitry 388 may be shared by multiple unit cells, including the unit cell 300. For example, the buffer 382, ADC 384, and/or clock and bias circuitry 388 may be selectively coupled to each unit cell, such as via time multiplexing, to allow readout of the residual voltage and the counter value.

As an example, in the depiction of FIG. 3, a unit cell may include the components on the first wafer 390 and the second wafer 392 that are to the left of the analog bus and the digital bus. This unit cell may, but need not, include the detector 305. In this regard, each unit cell may be considered as including or coupled to a respective detector. For instance, the unit cell may be considered as those components that facilitate readout of data captured by the detector, and thus the unit cell is considered as being coupled to the detector rather than as including the detector.

In an aspect, the unit cell 300 may be, may include, or may be a part of, the main circuit 118. The unit cell 300 may be, may be part of, and/or may be referred to as a pixel of the FPA 100. The unit cell 300 may be selectively connected to a column input line (e.g., 132) through a switch (e.g., 114), and/or a column output line (e.g., 134) through a switch (e.g., 116). In operation, the switch 114 may initially be open. In one embodiment, the switch 116 may also initially be open. In another embodiment, the switch 116 may initially be closed (e.g., to permit the readout of a data value detected by the unit cell 300).

In one or more embodiments, the unit cells 200 and 300 may be referred to as exhibiting a split-ADC architecture, a partitioned-ADC architecture, or a hybrid architecture (e.g., hybrid digital architecture). In this regard, the unit cells 200 and 300 may include components (e.g., 215, 225, 230, 392) associated with converting analog signals (e.g., voltage signals) into a first digital output (e.g., the counter value), and components (e.g., 240, 245, 390) associated with converting the residual voltage into a second digital output.

In an aspect, power dissipated during an integration cycle is signal dependent. In this regard, the power dissipated may be based at least on a magnitude of the EM radiation captured by the detectors (e.g., 205) of a unit cell array (e.g., 110). Power may be dissipated for each cycle of transitioning the comparator 225, resetting the comparator 225, and incrementing the counter value, among other operations associated with generating the counter value based on integrating detector signals at the capacitor 215. For example, for larger detector currents (e.g., based on higher flux scenes), a voltage ramp may have a larger slope such that a voltage threshold level is reached in a shorter period of time compared to smaller detector currents. The resultant counter value after a given integration period has a larger value than a case with smaller detector currents. In some cases, a high power dissipation and/or large variation in power dissipation for different scene conditions may make it difficult for a cooling system to keep operating temperature at a steady level for the imaging device 101 (e.g., the FPA 100 of the imaging device 101).

Since power dissipated is based at least on the number of times the digital counter is incremented, a conversion (e.g., coarser conversion) associated with fewer transitions of the digital counter may allow for lower power dissipation. For example, consider an 8 bit counter value with a 16 bit counter value. The maximum number of times the counter circuit may increment the counter value is 256 times for the 8 bit counter value, relative to 65,536 times for the 16 bit counter value. The 8 bit and 16 bit counter values are associated with 256 and 65,536 states, respectively. For the 8 bit counter value, a power difference between a detector signal associated with a counter value of 1 and a counter value of 256 is 256 to 1, rather than 65,536 to 1 for the 16 bit counter value.

In an aspect, a random telegraph noise (RTN) may need to be accounted for. The RTN may be based on charges being trapped and released at trap sites in materials (e.g., semiconductor materials). The RTN may have a fixed magnitude independent of operations (e.g., number of times the counter value is incremented). In cases in which each increment of the counter value is associated with a small amount of charge, the charges associated with the RTN may be comparable in the amount of charge that causes the counter value to increment. In this regard, the amount of charge needed to increment the counter value may be set by the reference voltage $V_{REF}$. To decrease the impact of RTN, the reference voltage $V_{REF}$ may be increased such that a voltage needed to cause the counter value to be incremented is increased.

In an embodiment, the split-ADC architecture may be utilized to, during operation, reduce power dissipation, reduce power dissipation variation, and/or reduce noise effects (e.g., RTN) during operation, e.g. relative to a cause in which only the counter value is used. Consider a comparison of between a case with a 16-bit counter value and a split-ADC architecture with an 8-bit counter value and an 8-bit digital output associated with the residual voltage. The use of the smaller counter value may allow for reduced power dissipation and a reduced power dissipation variation, due to fewer number of discrete states and/or fewer number of times the counter value is incremented. The finer granularity associated with the 16 bit counter value may be obtained by combining an 8 bit counter value with an 8 bit digital output associated with the residual voltage. The use of the smaller counter value may increase a difference between the voltage values in adjacent states, thus reducing the effect of RTN. The difference between the voltage values in adjacent states is provided by the voltage associated with the least significant bit. Such a difference may be referred to as a resolution associated with the counter value. In terms of chip real estate, the additional capacitor (e.g., 245) utilized in the split-ADC architecture may be at least partially offset by the smaller 8-bit counter circuit relative to the 16-bit counter circuit.

As an example, in a case in which a full well size is 100 million carriers (e.g., electrons), in implementing a 16-bit counter, around every 1,500 electrons may correspond to incrementing the counter value by 1. The full well size of the pixel may be the amount of charge (e.g., electrons) the pixel can hold before saturating. With further reference to the preceding example, in implementing an 8-bit counter, around every 400,000 electrons may correspond to incrementing the counter value by 1. In both cases, the RTN may be of the same magnitude, such that the effect of the RTN is more pronounced in the case of the 16-bit counter. In this regard, a lower-bit counter may be effectuated such that a minimum step size is not affected by parasitics in the unit cell (e.g., 200, 300) before the comparator (e.g., 225, 325). The resolution may be provided in terms of electrons per count, which represents the number of electrons needed to increment the count value. In the above examples, the resolution may be 1,500 electrons/count for the 16-bit counter and 400,000 electrons/count for the 8-bit counter. A minimum quantization size may be a function of the number of bits on the per-column ADC and the size of the well in the pixel. The total well size may be a function of the well in the pixel and the number of bits (e.g., most significant bits) in the counter on the digital wafer. Other example well sizes may be 500 million carriers, 1 billion carriers, higher number of carriers, or any number of carriers in between.

Figure 4:
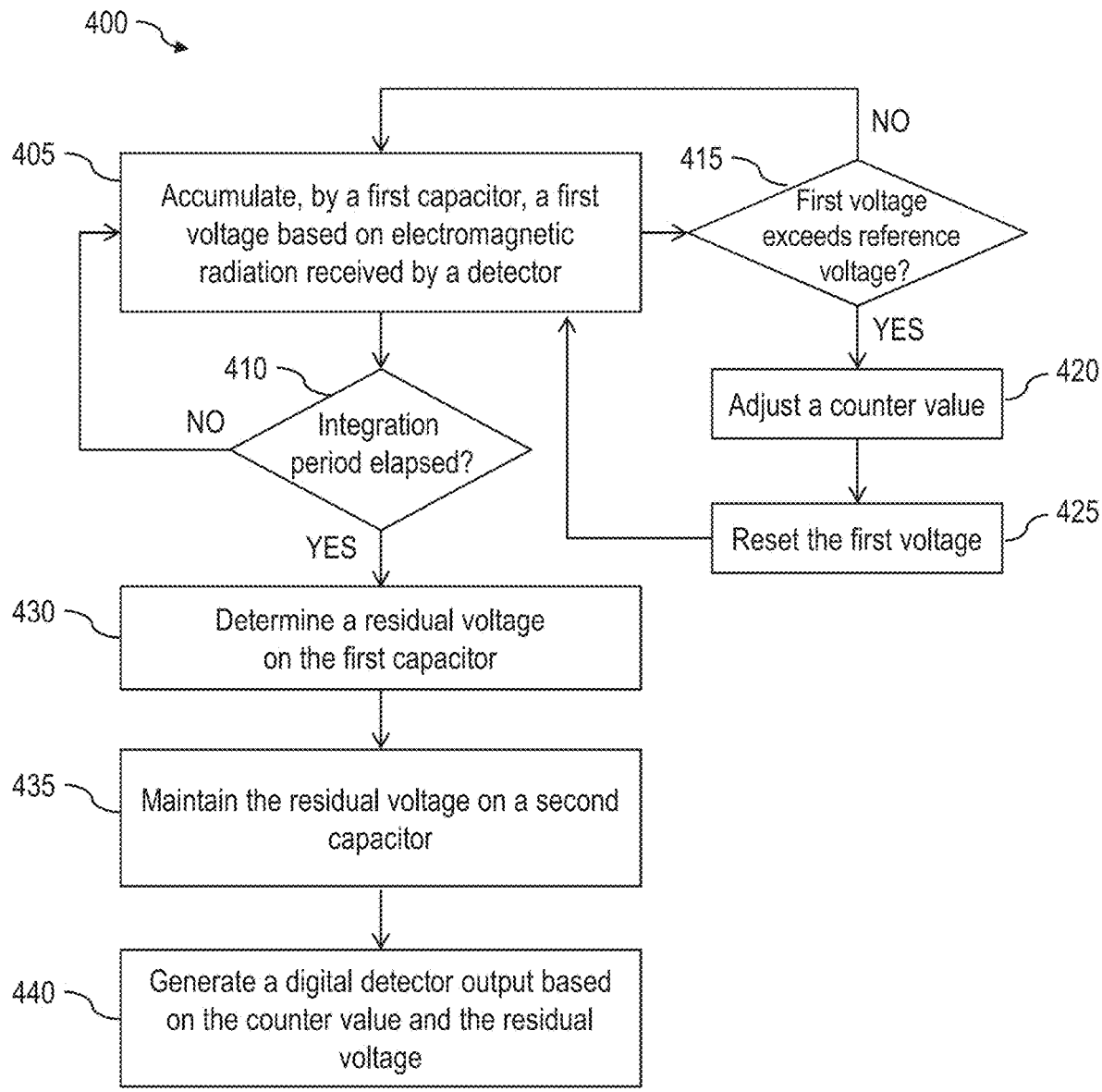
FIG. 4 illustrates a flow diagram of an example process for facilitating pixel readout with partitioned analog-to-digital conversion in accordance with an embodiment of the present disclosure.

FIG. 4 illustrates a flow diagram of an example process 400 for facilitating pixel readout with partitioned analog-to-digital conversion in accordance with an embodiment of the present disclosure. For explanatory purposes, the example process 400 is primarily described herein with reference to the unit cell 300 and associated circuitry shown in FIG. 3; however, the example process 400 is not limited to the unit cell 300 and associated circuitry shown in FIG. 3. For example, the unit cell 200 may be utilized. The blocks of example process 400 are described herein as occurring in serial, or linearly (e.g., one after another). However, multiple blocks of example process 400 may occur in parallel. In addition, the blocks of example process 400 need not be performed in the order shown and/or one or more of the blocks of example process 400 need not be performed.

At block 405, the capacitor 315 accumulates a voltage based on EM radiation received by the detector 305. For example, the detector 305 may generate a detector signal (e.g., detector current) and provide the detector signal to the capacitor 315 (e.g., via the transistor 310 with a bias gate). The capacitor 315 may integrate the detector signal from the detector 305 to generate the voltage. In this regard, the voltage may be a voltage ramp whose slope is proportional to the magnitude of the detector signal. Such integration may occur during an integration period.

At block 410, a determination is made as to whether the integration period has elapsed. If the integration has not elapsed, the capacitor 315 continues to accumulate the voltage at block 405. At block 415, a determination is made as to whether the voltage accumulated by the capacitor 315 exceeds a reference voltage $V_{REF}$. The determination may be made by the comparator 325. The comparator 325 may compare the voltage accumulated by the capacitor 315 with the reference voltage $V_{REF}$. If the voltage accumulated by the capacitor 315 does not exceed the reference voltage $V_{REF}$, the capacitor 315 continues to accumulate the voltage at block 405.

If the voltage accumulated by the capacitor 315 exceeds the reference voltage $V_{REF}$, the counter circuit 330 adjusts (e.g., increment) a counter value at block 420. For example, the comparator 325 may generate a signal that, when received/processed by the counter circuit 330, causes the counter circuit 330 to adjust the counter value. The comparator 325 may generate such a signal when the voltage accumulated by the capacitor 315 exceeds the reference voltage $V_{REF}$. At block 425, the voltage accumulated by the capacitor 315 is reset. The switch 320 may be considered a reset circuit. The comparator 325 may generate a signal that causes the switch 320 to close and allow reset of the capacitor 315. In an aspect, the same signal from the comparator 325 may cause the counter circuit 330 to adjust the counter value and the switch 320 to close. In another aspect, different signals are provided by the comparator 325. In an embodiment, the blocks 405, 410, 415, 420, and 425 are performed during the integration period.

If the integration period is determined to have elapsed at block 410, a residual voltage on the capacitor 315 is determined at block 430. For example, when the integration period elapses, a sample and hold circuit formed of the switch 340 and the capacitor 345 may determine the residual voltage by sampling the voltage on the capacitor 315 when the integration period has elapsed. At block 435, the capacitor 345 maintains (e.g., holds) the residual voltage. The capacitor 345 may hold the residual voltage until the residual voltage is to be provided to an analog bus (e.g., 270) to be read by column circuitry.

At block 440, a processing circuit, such as the off-chip digital post processing and calibration circuit 386, generates a digital detector output based on the counter value and the residual voltage. In some cases, the residual voltage may be digitized by an ADC in column circuitry. In such cases, the processing circuit may generate the digital detector output based on the counter value and the digitized residual voltage. In an aspect, the digital detector output may be generated based on a combination of the counter value and the residual voltage (and/or digitized version thereof). In this regard, the counter value and/or the residual voltage may be processed (e.g., calibrated, scaled, aligned) so that they may be appropriately combined.

As indicated previously, in an aspect, the blocks of the example process 400 may be performed in parallel. For example, the blocks 405, 420, and 425 may be utilized to generate the counter value while the residual voltage is determined at block 430, maintained at block 435, and/or processed (e.g., digitized, scaled, calibrated) at, prior to, and/or subsequent to block 440.

In some embodiments, the split-ADC architecture may include unit cells with bolometers as their detector. Implementation of the split-ADC architecture using bolometers may help achieve minimal ROIC noise and snapshot integration of the unit cells. In this regard, in an aspect, the split-ADC architecture may allow all bolometers to be on at the same time to achieve a snapshot integration with minimal ROIC noise.

In an embodiment, a large well size may be available in the split-ADC architecture while maintaining responsiveness to an analog residue (e.g., residual voltage) that is digitized. For example, the well size may be between 500 million carriers (e.g., electrons) to 1 billion carriers (e.g., electrons) in some cases. With the large well size, digital removal of ambient temperature changes and/or accommodation of detector (e.g., bolometer) variability and large dynamic scene range (e.g., scene temperature range) may be facilitated. Detector variability may be due to mismatches between detectors, which are generally small random variations that occur during the manufacture of the detectors (e.g., nominally identical detectors). In some cases, such digital removal and accommodation may be implemented without processing or with minimal processing to cause an analog signal to stay within a certain dynamic range (e.g., within a certain range of values). Additional processing is generally associated with additional noise.

For example, such processing in bolometer ROICs may include filtering of an analog signal to keep an output signal in range while maximizing a gain to achieve a desired noise equivalent differential temperature (NEDT). The analog signal may be filtered to mitigate bolometer variability, change in ambient temperature, and/or very hot scenes, each of which may cause an analog output to hit an upper or a lower rail and thus hit a minimum or maximum output value (e.g., minimum or maximum digital output count). The higher number of total bits provided in the split-ADC architecture may allow for an increase in the dynamic range, thus allowing bolometer circuits to be read out without filtering or with minimal filtering of an analog signal.

In some embodiments, even with the large well size, a large temperature pedestal may exist for bolometers that can be larger than the well size. When optimizing the NEDT, bolometer resistance may be reduced, integration times may be increased, and bolometer bias may be increased. These three parameters may include a total charge that is to be accumulated in a frame. In addition, as temperature increases, the bolometer resistance decreases exponentially and, accordingly, the charge to be collected in a frame increases exponentially. To reserve room in the dynamic range of the ROIC for scene changes and bolometer variability, the temperature pedestal may be determined and removed due to its effect on baseline bolometer resistance, bias, and integration time, which increase exponentially with ambient temperature.

In one or more embodiments, to determine and remove the temperature pedestal, the split-ADC architecture may include active unit cells and reference unit cells. Each active unit cell may include a detector that captures a portion of an incident scene and generate an associated output. The output may be, or may be derived into, the combined counter value (e.g., combination of a counter value from a counter circuit and a digitized residual voltage). Each reference unit cells may include a detector and a structure (e.g., lid, cover) that blocks the detector from the scene that is incident on the active unit cells. In this regard, a reference unit cell and its detector may be referred to as a blind unit cell and a blind detector, respectively. The reference unit cells may capture a value (e.g., an absolute value) of a temperature pedestal that is incident on the active unit cells and the reference unit cells. In an aspect, the temperature pedestal may also be referred to as a temperature offset, an ambient temperature pedestal, or an ambient temperature offset. In some cases, the temperature pedestal may be sufficiently large to saturate the active unit cells and cause their counter values to loop. In some cases, by removing the temperature pedestal, non-linearities associated with some residual current that gets shunted away and not integrated at the integration capacitor may be corrected. In an embodiment, the active unit cells and reference unit cells include a bolometer (e.g., microbolometer) as their detector. In this regard, in an aspect, the split-ADC architecture may allow all bolometers to be on at the same time to achieve a snapshot integration with minimal ROIC noise while also removing an ambient temperature offset. In some cases, a detector of an active unit cell may be referred to as an active unit cell detector, and a detector of a reference unit cell may be referred to as a reference unit cell detector.

To facilitate capturing the value of the temperature pedestal, the split-ADC architecture may be implemented to allow for pixel readout with counter value loopback mitigation. In this regard, a combined counter value may include the combination of the counter value from a counter circuit (e.g., 330) and the digitized residual voltage from an ADC (e.g., 384). The combined counter value may loop back when incremented from its maximum counter value. For example, when the combined counter value is a 16-bit counter value at its maximum value $2^{16}-1$ (i.e., 65,535 counts), the combined counter value loops back to zero when incremented. When mitigation techniques are not applied, such loop back of the combined counter value is generally associated with loss of information.

The reference unit cells may accommodate for a higher combined counter value, such as a higher bit counter circuit, that allows the temperature pedestal to be captured without looping of the combined counter value. In this manner, the reference unit cells may be utilized to determine whether some of the combined counter values of the active unit cells have looped a different number of times than the combined counter values of other active unit cells. Thus, the combined counter values of the reference unit cells may be utilized to help mitigate counter value looping exhibited by the active unit cells. For example, while the active unit cells may be associated with X-bit combined counter values, the reference unit cells may be associated with Y-bit combined counter values, where Y is greater than X and Y is selected such that the absolute value of the ambient temperature pedestal may be captured (e.g., the ambient temperature pedestal is not large enough to cause the Y-bit combined counter value to loop).

In some aspects, chip area associated with mitigating combined counter value loopback mitigation may be reduced by using reference unit cells, relative to a case in which all active unit cells have associated components capable of processing and/or storing higher combined counter value. For example, an FPA (e.g., 100) may include 2048×2048 active unit cells, with 2048×20 reference unit cells positioned in proximity to the FPA. The reference unit cells may be around, along the side, or generally positioned relative to the active unit cells such that an ambient temperature experienced by the reference unit cells is equal or substantially equal to an ambient temperature experienced by the active unit cells. While each of the 2048×20 reference unit cells may be larger than each of the 2048×2048 active unit cells, the chip area associated with the 2048×20 reference unit cells is generally less than the chip area associated with making the 2048×2048 active unit cells sufficiently large to avoid loopback.

Figure 5:
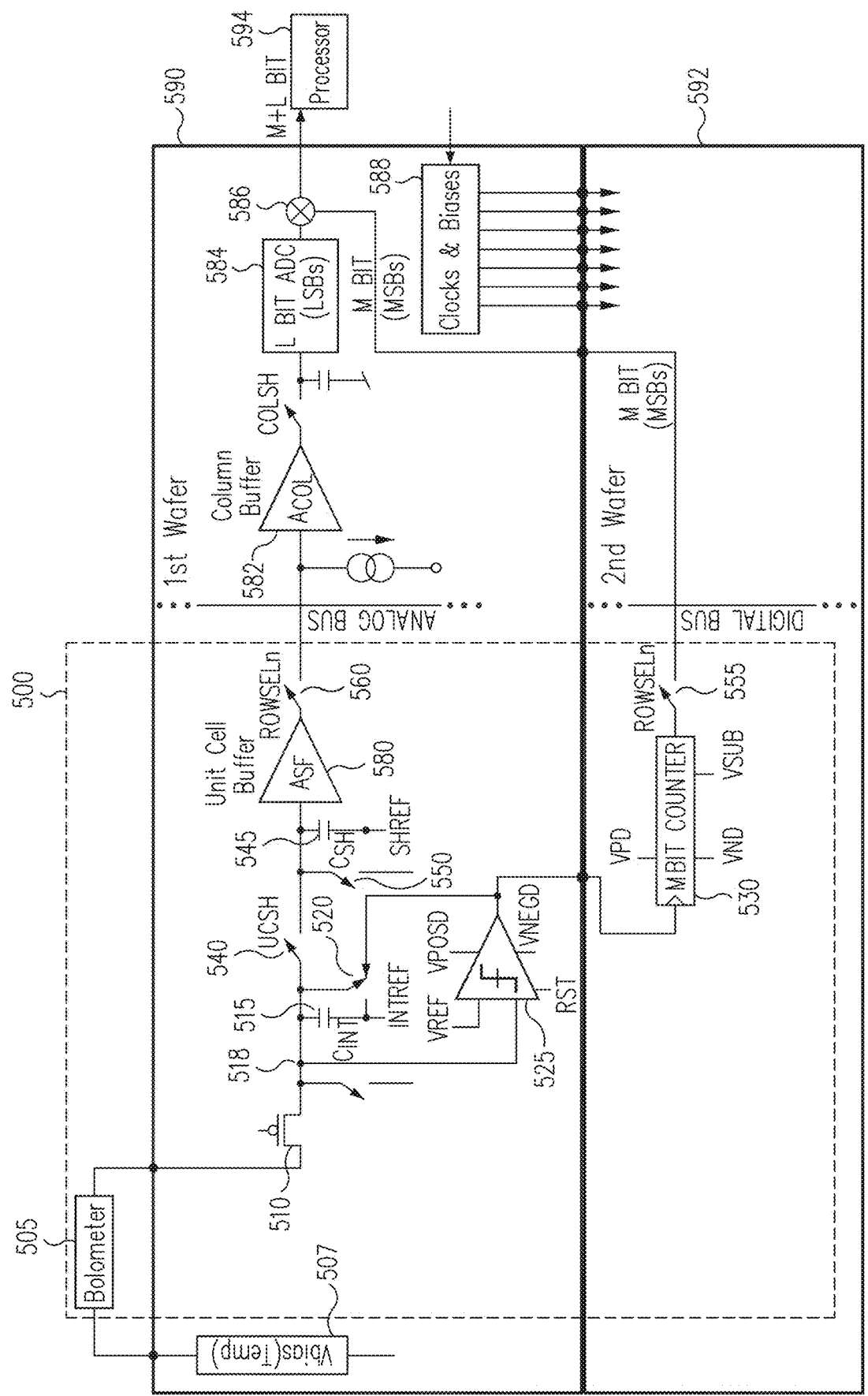
FIG. 5 illustrates an example of a unit cell and associated circuitry in accordance with an embodiment of the present disclosure.

FIG. 5 illustrates an example of a unit cell 500 and associated circuitry in accordance with an embodiment of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The description of FIGS. 2 and 3 generally applies to FIG. 5, with examples of differences and other description provided herein for purposes of clarity and simplicity. In this regard, in an aspect, the description of the unit cell 300, detector 305, transistor 310, capacitor 315, node 318, switch 320, comparator 325, counter circuit 330, switch 340, capacitor 345, switch 350, switch 355, switch 360, buffer 380, buffer 382, ADC 384, and clock and bias circuitry 388, shown in FIG. 3 generally applies to the unit cell 500, a detector 505, transistor 510, capacitor 515, node 518, switch 520, comparator 525, counter circuit 530, switch 540, capacitor 545, switch 550, switch 555, switch 560, buffer 580, buffer 582, ADC 584, and clock and bias circuitry 588, respectively. The detector 505 may be biased with a bias signal (e.g., bias voltage) from a bias circuit 507. In an aspect, as shown in FIG. 5, the detector 505 is a bolometer (e.g., microbolometer). In another aspect, the detector 505 may be a photodetector (e.g., avalanche photodiode, infrared photodetector, quantum well infrared photodetector). In an embodiment, the unit cell 500 or components thereof may be, may include, or may be a part of, the unit cell 200, unit cell 300, and/or components thereof.

A combiner circuit 586 may provide some functionality provided by the off-chip digital post processing and calibration circuit 386 of FIG. 3. The combiner circuit 586 may process the counter value from the counter circuit 330 and/or the digital output of the ADC 584 and combine the counter value (e.g., processed counter value) with the digital output (e.g., processed digital value) to form a combined digital output (e.g., as part of the data output signal on the data output line 192). In FIG. 5, the ADC 584 provides an L-bit digital output and the counter circuit 530 provides an M-bit counter value, such that the combiner circuit 586 provides a combined (L+M)-bit output. In some cases, the digital output of the ADC 584 may form, or may be processed to form, the least significant bits of the combined (L+M)-bit output whereas the counter value may form, or may be processed to form, most significant bits of the combined (L+M)-bit output. A processor 594 may perform processing of the combined counter values of the active unit cells and the reference unit cells. Although the combiner circuit 586 and the processor 594 are shown as separate circuitry, in some cases they may be part of the same processing circuit. In some cases, the combiner circuit 586 and the processor 594 may be shared by one or more active unit cells and/or one or more reference unit cells.

The unit cell 500 includes a portion of a first wafer 590 and a portion of a second wafer 592. In some cases, the first wafer 590 and the second wafer 592 may be referred to as an analog wafer/portion and a digital wafer/portion, respectively, since the first wafer 590 is associated with generation and processing of the residual voltage (e.g., an analog signal) whereas the second wafer 592 is associated with generation and processing of the counter value (e.g., a digital value). The first wafer 590 may also include the bias circuit 507, buffer 582, ADC 584, combiner circuit 586, and clock and bias circuitry 588. In some cases, the detector 505 (e.g., the bolometer) may be provided (e.g., fabricated) on top of the first wafer 590. As an example, the first wafer 590 and the second wafer 592 may be a 130 nm wafer and a 65 nm wafer, respectively. It is noted the description of the wafers 390 and 392 of FIG. 3 generally applies to the wafers 590 and 592, respectively, of FIG. 5, with examples of differences and other description provided herein for purposes of clarity and simplicity.

In an aspect, the unit cell 500 may be, may include, or may be a part of, the main circuit 118. The unit cell 500 may be, may be part of, and/or may be referred to as a pixel of the FPA 100. The unit cell array 110 may include active unit cells and reference unit cells. In some cases, the unit cell array 110 may include, or may be considered to include, active unit cells and reference unit cells. In other cases, the unit cell array 110 may exclusively include active unit cells, with additional rows and/or columns of reference unit cells provided around the unit cell array 110. For example, the unit cell array 110 may include 2048×2048 active unit cells. An additional 2048×20 reference unit cells may be provided in proximity to the unit cell array 110 (e.g., the reference and active unit cells are positioned such that they experience the same or similar ambient temperature). The unit cell 500 may be selectively connected to a column input line (e.g., 132) through a switch (e.g., 114), and/or a column output line (e.g., 134) through a switch (e.g., 116). In operation, the switch 114 may initially be open. In one embodiment, the switch 116 may also initially be open. In another embodiment, the switch 116 may initially be closed (e.g., to permit the readout of a data value detected by the unit cell 500).

In some embodiments, to facilitate accounting for (e.g., mitigation of) a temperature pedestal, the unit cell 500 may be, may include, or may be a part of, an active unit cell or a reference unit cell. In some aspects, to reduce or remove an ambient temperature pedestal from a signal (e.g., incident EM energy), the reference unit cell may include a blind detector that may be used to capture (e.g., determine) an absolute value of the ambient temperature pedestal. In an embodiment, the blind detector may be a blind bolometer (e.g., also referred to as a blind-released bolometer). The blind detector may include a detector (e.g., 505) and an overlying structure (e.g., cover, lid) positioned over the detector (e.g., fabricated on top of the detector) to block (e.g., blind) the scene from the detector. In other words, the blind detector is blind to the scene (e.g., receives no or receives negligible scene information). A signal output of the blind detector is based on ambient temperature and can be considered as being independent of the scene.

In some aspects, various components of an active unit cell are the same or similar to the various components of a reference unit cell. In this regard, the unit cell 500 may be an active unit cell or a reference unit cell. In some cases, a counter circuit (e.g., 530) and/or an ADC (e.g., 584) of an active unit cell may be associated with a different number of bits a counter circuit and/or an ADC of a reference unit cell. In an embodiment, a counter circuit (e.g., 530) of a reference unit cell may generate N-bit counter values whereas a counter circuit (e.g., 530) of an active unit cell may generate M-bit counter values, where N is greater than M to facilitate determining of the temperature pedestal by the reference unit cell. In this regard, the active unit cell is generally associated with smaller chip real estate than the reference unit cell, since a lower bit counter circuit is generally smaller than a higher bit counter circuit. As an example, in this embodiment, for a reference unit cell, the combiner circuit 586 may receive an L-bit output from its ADC 584 and an N-bit output from its counter circuit 530 and generate a Y-bit output where Y=L+N. For an active unit cell, the combiner circuit 586 may receive an L-bit output from its ADC 584 and an M-bit output from its counter circuit 530 and generate a X-bit output where X=L+M.

In another embodiment, alternatively or in addition to the counter value having a different number of bits for the active and reference unit cells, the number of bits associated the output of the ADC 584 may be different between the active and reference unit cells. For discussion purposes, the number of bits of the ADC 584 is the same for the active unit cell and the reference unit cell, whereas the number of bits of the counter circuit 530 is different between the active unit cell and the reference unit cell.

Using various embodiments, the reference unit cell may have a higher dynamic range than the active unit cell to facilitate the capture of the absolute value of the ambient temperature pedestal. In some cases, the temperature pedestal may be sufficiently large such that the temperature pedestal necessitates counter values higher than those encompassed by the active unit cells. For example, an active unit cell may have a 10-bit counter circuit and a 10-bit ADC output (e.g., to collectively provide counter values from 0 to $2^{20}-1$, inclusive), whereas the temperature pedestal may have a value exceeding the 20-bit output encompassed by the active unit cell. In this example, the 20-bit counter value loops back to zero when incremented from the maximum value $2^{20}-1$. An example of a counter value that loops back to zero is shown for example in FIG. 7.

In one example, the reference unit cells may have a 20-bit counter circuit and a 10-bit ADC output which together provide a 30 bit dynamic range (e.g., about three orders of magnitude larger dynamic range than the active pixels). In this regard, the dynamic range of the blind pixels may be provided to allow capture of an absolute level of the blind pixels (e.g., without saturating the blind pixels' counter and looping back), thus tracking the ambient temperature.

Figures 6A, 6B, 7:
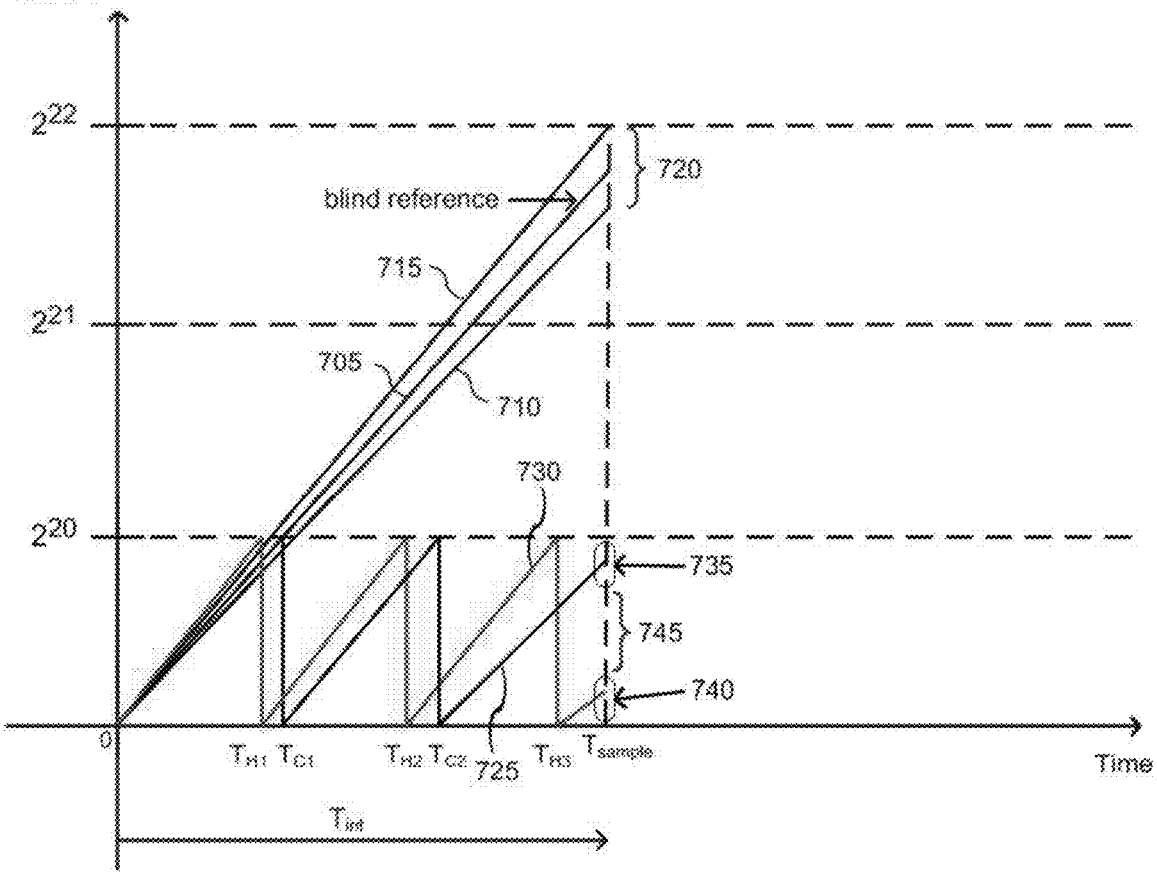
FIG. 6A illustrates an example scene captured by active unit cells of a focal plane array in accordance with an embodiment of the present disclosure.
FIG. 6B illustrates an example structure that is imaged by a reference unit cell of a focal plane array in accordance with an embodiment of the present disclosure.
FIG. 7 illustrates a graph of counter values and associated variability for active and reference unit cells as a function of time in accordance with an embodiment of the present disclosure.

FIG. 6A illustrates an example scene 600 captured by the active unit cells of an FPA (e.g., 100) in accordance with an embodiment of the present disclosure. Each active unit cell may capture a portion of the scene 600. The scene 600 includes a cold part 605 and a hot part 610. FIG. 6B illustrates a structure 615 (e.g., lid, cover) that is imaged by each reference unit cell in accordance with an embodiment of the present disclosure. The structure 615 blocks the scene 600 from the reference unit cell, such that the reference unit cell captures an ambient temperature. The structure 615 may be considered a scene that exclusively includes ambient temperature information.

FIG. 7 illustrates a graph 700 of counter values (e.g., in decimal space) and associated variability for active and reference unit cells as a function of time in accordance with an embodiment of the present disclosure. In an aspect, the counter values are the combined counter values obtained by combining a digital output of an ADC (e.g., 584) and a counter value from a counter circuit (e.g., 530). The combined counter values are incremented over an integration time $T_{int}$ and sampled once the integration time has elapsed at $T_{sample}$.

The graph 700 shows ramps 705, 710, and 715 associated with a reference unit cell and ramps 725 and 730 associated with an active unit cell. The ramp 705 represents a counter value that is incremented over time for a reference unit cell, whereas the ramps 710 and 715 illustrate a detector variability 720 about the ramp 705. The ramp 710 represents a maximum negative variability relative to the ramp 705, and the ramp 715 represents a maximum positive variability relative to the ramp 705. In this regard, a ramp representing a change in counter value over time for the reference unit cells of the FPA 100 may generally be between the ramps 710 and 715.

The ramps 725 and 730 represent a counter value that is incremented over time for an active unit cell that receives the cold part 605 and hot part 610, respectively, of the scene 600. The ramps 725 and 730 are associated with variabilities 735 and 740, respectively. In this regard, an active unit cell may generally have a ramp that is within the variability 735 or the variability 740 based on which part of the scene is captured by the active unit cell. In an aspect, the variability of the unit cells (e.g., active unit cells, reference unit cells) may be due to mismatches associated with components of the unit cells. In an aspect, at the end of the integration period, no active unit cells provide a counter value with a buffer zone 745.

As shown in FIG. 7, the counter value of the active unit cells (e.g., 20 bits) is large enough to include the detector variability (e.g., bolometer variability) across the FPA 100, a largest scene temperature range, and the buffer zone 745 (e.g., also referred to as a dead zone). In FIG. 7, the counter values of an active unit cell loops either two or three times, with the active unit cells that have looped three times (e.g., at time $T_{H1}$, $T_{H2}$, and $T_{H3}$) having a lower 20-bit counter value than the active unit cells that have looped two times (e.g., at times $T_{C1}$ and $T_{C2}$). In this regard, the counter values for the active unit cells that capture the cold part 605 of the scene 600 loop two times whereas the counter values for the active unit cells that capture the hot part 610 of the scene 600 loop three times, with the counter values for the active unit cells that capture the hot part 610 being lower than those for the active unit cells that capture the cold part 605. While the active unit cells have a maximum counter value of $2^{20}-1$ counts, the reference unit cell has a larger maximum counter value, such as $2^{30}-1$. As shown in FIG. 7, even accounting for reference detector variability, the count value of the reference unit cells is between $2^{21}$ counts and $2^{22}$ counts at $T_{sample}$, which are below the maximum count, thus allowing the reference unit cells to track the ambient temperature pedestal without having their count value looping.

In an aspect, the range of counter value outputs associated with the active unit cells is large enough to include a dynamic range associated with a scene (e.g., real-world scene), variability, and a buffer zone to allow determination of which active unit cells' counter values may have looped one more time compared to other active unit cells. The dynamic range associated with the scene may be within a minimum scene temperature and a maximum scene temperature accommodated by the detector. The minimum and maximum accommodated scene temperature may be based on application (e.g., temperature range over which the FPA 100 is expected to operate correctly). In this regard, the range of counter value outputs of the active unit cell between a minimum scene temperature and a maximum scene temperature is within the same loop or offset by one loop. In some cases, the range associated with the 20-bit counter values may accommodate a dynamic range of 500° C., 1000° C., or other dynamic range based on an environment within which the FPA 100 is to be operated.

In some cases, a bolometer variability may be constrained to ensure a buffer zone, with the bolometer variability increasing exponentially with temperature coefficient of resistance (TCR) of a bolometer. To keep bolometer variability within range, at higher temperatures the bias across the bolometer may be reduced. In this regard, the bias circuit 507 may determine and generate the bias (e.g., bias voltage) to be applied across the bolometer of the active unit cells and the reference unit cells. The bias may be referred to as a detector bias. In some cases, the same bias (e.g., global bias) may be applied to the active unit cells and the reference unit cells. The bias circuit 507 may adaptively set the bias to be applied based on a temperature. In an aspect, the bias may be adjusted based on a distribution of the reference unit cells. As the temperature increases, the bolometers increase in non-uniformity. In some cases, the non-uniformity of the active unit cells and the reference unit cells are the same or similar. In these cases, as an example, to keep the non-uniformity of the active unit cells to less than 50% of the dynamic range, the detector bias may start to be decreased if the reference unit cells' non-uniformity increases past 50% of the dynamic range. The bias circuit 507 may be, may include, or may be a part of, a CMOS circuit to measure temperature, a bolometer-based circuit, and/or a DAC controlled by a user. As an example, the bias may be a bias voltage between 100 mV and 1.5 V. In some cases, the bias circuit 507 may be shared by multiple bolometers (e.g., 505). In other cases, the bolometer of each unit cell may be coupled to a respective bias circuit 507 (e.g., the bias circuit 507 may be considered part of the unit cell).

Figure 8:
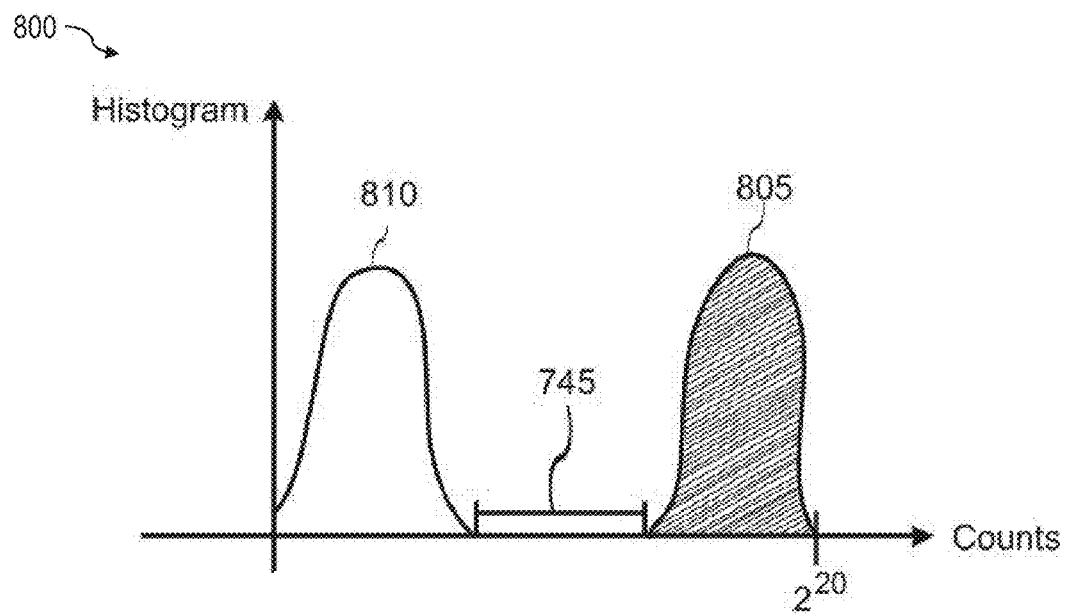
FIG. 8 illustrates a graph of an example distribution of counter values of active unit cells when capturing image data from the scene of FIG. 6A in accordance with an embodiment of the present disclosure.

FIG. 8 illustrates a graph 800 of an example distribution of 20-bit counter values of the active unit cells when capturing image data from the scene 600 of FIG. 6, in accordance with an embodiment of the present disclosure. As an example, the 20-bit counter values of the active unit cells may be obtained from combining a 10-bit digital representation (e.g., generated by the ADC 584) associated with a residual voltage after the integration period $T_{int}$ has elapsed and a 10-bit counter value (e.g., from the counter circuit 530). In the graph 800, the horizontal axis provides the 20-bit counter values and the vertical axis provides, for a given 20-bit counter value, the number of active unit cells that generated the 20-bit counter value. Since the scene 600 includes the cold part 605 and the hot part 610, the distribution includes a distribution 805 obtained from the active unit cells that capture a portion of the cold part 605 and a distribution 810 obtained from the active unit cells that capture a portion of the hot part 610. With reference to FIG. 7, in an aspect, the active unit cells that capture a portion of the cold part 605 may increment their counter value over time substantially in accordance with the ramp 725 and associated variability 735. The active unit cells that capture a portion of the hot part 610 may increment their counter value over time substantially in accordance with the ramp 730 and associated variability 740.

As shown in FIGS. 7 and 8, although higher counter values are generally associated with higher temperatures, the looping of the 20-bit counter values upon being incremented when the counter value is at a maximum counter value (e.g., $2^{20}-1$) may cause the active unit cells that capture the hot part 610 of the scene 600 to be at lower counter values than the active unit cells that capture the cold part 605 of the scene 600. In the example of FIG. 7, the counter values for the active unit cells that capture the hot part 610 loop one additional time compared to the counter values for the active unit cells that capture the cold part 605. The processor 594 may add an additional $2^{20}$ counts (e.g., associated with an additional looping of the 20-bit counter value) to the counter values of the active unit cells that capture the hot part 610 to mitigate the effect of the active unit cells that capture the hot part 610 looping an additional time relative to the active unit cells that capture the cold part 605.

Figure 9:
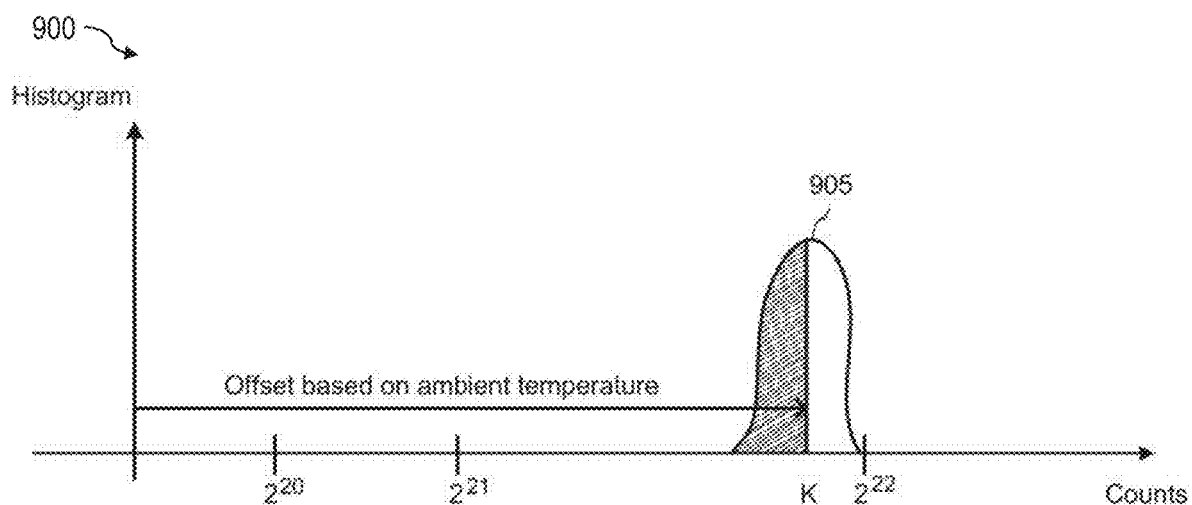
FIG. 9 illustrates a graph of an example distribution of counter values of a reference unit cells in accordance with an embodiment of the present disclosure.

FIG. 9 illustrates a graph 900 of an example distribution 905 of Y-bit counter values of the reference unit cells, with each reference unit cell blocked from the scene 600 of FIG. 6 by a structure (e.g., 615), in accordance with one or more embodiments of the present disclosure. The distribution 905 may encompass the ambient temperature pedestal at K counts. The distribution 905 of counts about the ambient temperature pedestal may result from bolometer variability. In some cases, the K counts may be obtained from an average of the Y-bit counter values of all the reference unit cells.

In an embodiment, once the readouts associated with the reference unit cells and active unit cells are collected and provided to the processor 594, the processor 594 may determine an average of the Y-bit combined counter values for the reference unit cells and generate reconstructed image data for the active unit cells by adding the determined average to the X-bit combined counter values of the active unit cells. The processor 594 may then determine whether any of the active unit cells need to have an additional $2^{20}$ counts added to their counter values (e.g., due to looping an additional time) and add the additional $2^{20}$ counts to these counter values.

Figure 10:
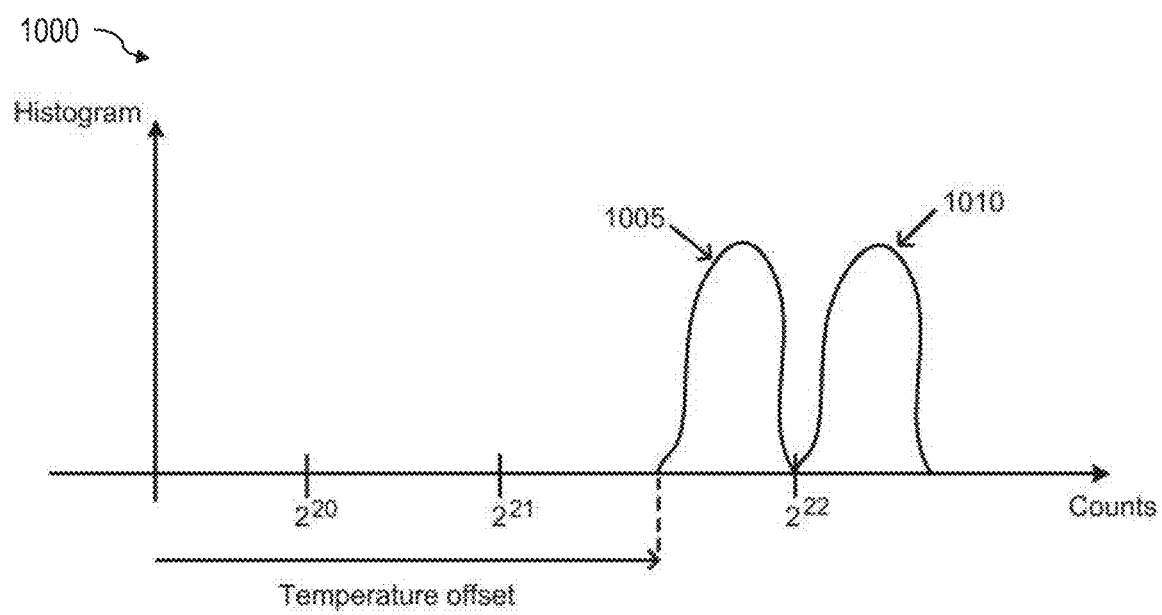
FIG. 10 illustrates a graph of an example distribution representing reconstructed image data generated based on the distributions shown in FIGS. 8 and 9 in accordance with an embodiment of the present disclosure.

For example, FIG. 10 illustrates a graph 1000 of an example distribution representing reconstructed image data generated based on the distributions 800 and 900 shown in FIGS. 8 and 9 in accordance with an embodiment of the present disclosure. To arrive at the graph 1000, the average of the Y-bit combined counter values for the reference unit cells is added to the active unit cells and the additional $2^{20}$ counts added to the counter values associated with those active unit cells that captured the hot part 610 of the scene 600. The distribution includes a distribution 1005 and 1010 associated with the active unit cells that capture the cold part 605 and the hot part 610 of the scene 600, respectively, with the additional looping associated with the active unit cells that capture the hot part 610 having been accounted for through the addition of the $2^{20}$ counts.

In some cases, with the counter values of the active unit cells having been brought into a higher bit space (e.g., 30-bit space associated with the reference unit cells), the processor 594 may shift the counter values of the active unit cells back to the 20-bit space associated with the active unit cells to obtain reconstructed image data with the ambient temperature offset removed. As shown in FIG. 10, shifting the counter values back to the 20-bit space may facilitate higher processing and/or storing efficiency, since the processing and/or storing may be performed in the 20-bit space rather than the higher bit space. In other cases, processing and/or storing may be performed in the higher bit space (e.g., without shifting the counter values back to the 20-bit space).

Figure 11:
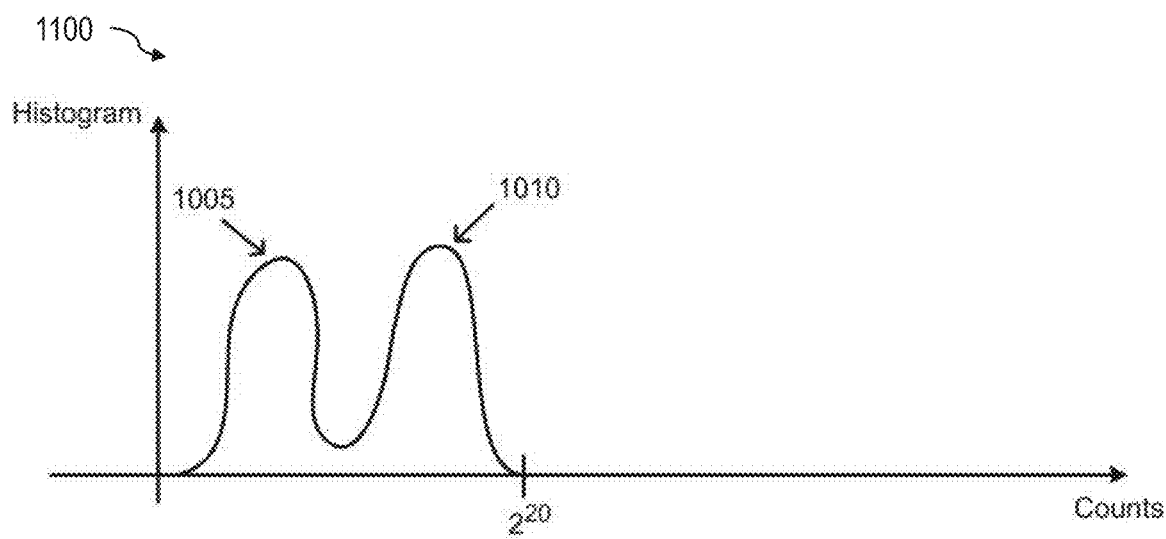
FIG. 11 illustrates a graph of an example distribution representing reconstructed image data generated based on the distribution shown in FIG. 10 in accordance an embodiment of the present disclosure.

FIG. 11 illustrates a graph 1100 of an example distribution representing reconstructed image data generated based on the distribution shown in FIG. 10 in accordance with one or more embodiments of the present disclosure. The distribution includes distributions 1105 and 1110 obtained by shifting the distributions 1005 and 1010, respectively, back to the 20-bit space by subtracting the counter values (e.g., in the higher bit space as shown in FIG. 10) associated with the active unit cells by a minimum counter value (e.g., in the higher bit space as shown in FIG. 10) among the counter values. The processor 594 may then process and/or store the distribution shown in FIG. 11. The processor 594 may generate a reconstructed image (e.g., reconstructed IR image) based on the distribution shown in FIG. 11 and which of the active unit cells captured which counter values.

Although FIGS. 7-11 illustrate distributions based on a scene that is half cold (e.g., at a constant low temperature) and half hot (e.g., at a constant hot temperature), the scene may include less, more, or different temperature distribution(s). In such cases, the distributions do not include two discrete distributions like those shown in FIGS. 8, 10, and 11. For example, a scene may include a single, more spread out distribution rather than two or more discrete distributions. Furthermore, although FIGS. 7-11 illustrate example distributions in which an additional $2^{20}$ is added to a subset of the active unit cells to account for an additional looping of the counter values of the subset, in other cases, the counter values of all the active unit cells may loop the same number of times. In these cases, no additional $2^{20}$ is added to any of the active unit cells, since the looping affected all the active unit cells in the same manner. For example, if the integration period $T_{int}$ in FIG. 7 is defined to be between $T_{C2}$ and $T_{H3}$, the active unit cells that capture the cold part 605 and those that capture the hot part 610 may loop the same number of times (e.g., twice).

In some embodiments, the processor 594 may determine the buffer zone (e.g., 745) in order to determine which (if any) of the active unit cells' X-bit counter values to add an additional $2^X$ counts (e.g., an additional $2^{20}$ counts). The processor 594 may determine one bound of the buffer zone by determining a minimum counter value associated with the reference unit cells. The bound may be an upper bound or a lower bound. In this regard, the minimum counter value is the minimum among the Y-bit counter values generated by the reference unit cells. The processor 594 may then determine the X LSBs associated with the minimum counter value. In some cases, since the Y-bit counter values of the reference unit cells are associated with the ambient temperature, the processor 594 may offset the X LSBs associated with the minimum counter value based on a difference between the ambient temperature and a minimum scene temperature accommodated by the reference unit cells (e.g., according to device specification requirements) to obtain an offset minimum counter value. In this regard, the processor 594 may determine a count to be subtracted from the X LSBs associated with the minimum counter value to obtain the offset minimum counter value, where the determined count is based on the difference between the ambient temperature and a minimum scene temperature. The count to be subtracted may be determined based on calibration data, empirical data, and/or other data associated with the reference unit cells. The processor 594 may set the offset minimum counter value as one bound of the buffer zone. When the ambient temperature corresponds with the minimum scene temperature, no additional offset is applied to the X LSBs associated with the minimum counter value.

The processor 594 may determine the other bound of the buffer zone by subtracting a predetermined number of counts from the offset minimum counter value. The predetermined number of counts may be based on a percentage of $2^X$ counts. For example, the percentage may be 25%. In this example, the other bound is determined by subtracting 25% of $2^{20}$ from the offset minimum counter value. The processor 594 adds an additional $2^X$ counts to any active unit cells whose X-bit counter value is below a lower bound of the buffer zone. In some cases, these active unit cells are those whose counter values have looped an additional time relative to other active unit cells. For example, in FIG. 9, the active unit cells associated with the distribution 810 (e.g., those active unit cells that captured the hot part 610 of the scene 600) are below the lower bound of the buffer zone. The processor 594 adds an additional $2^{20}$ to these active unit cells. An example in which the active unit cells loop the same number of times, and thus no additional $2^X$ (counts is added, is shown with reference to FIG. 14.

Figure 12:
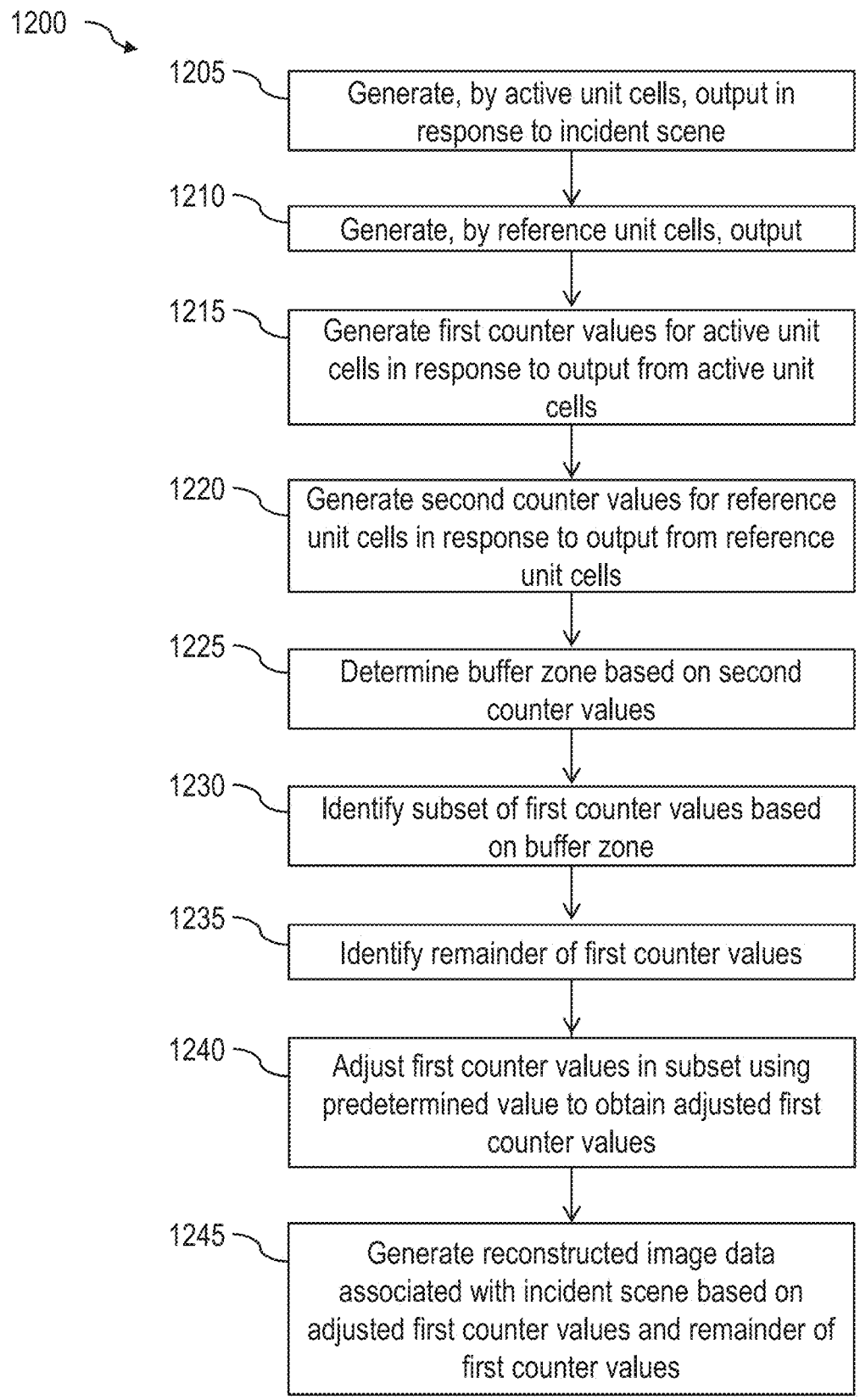
FIG. 12 illustrates a flow diagram of an example process for facilitating pixel readout with counter value loopback in accordance with an embodiment of the present disclosure.

FIG. 12 illustrates a flow diagram of an example process 1200 for facilitating pixel readout with counter value loopback in accordance with an embodiment of the present disclosure. For explanatory purposes, the example process 1200 is primarily described herein with reference to the unit cell 500 and associated circuitry shown in FIG. 5; however, the example process 1400 is not limited to the unit cell 500 and associated circuitry shown in FIG. 5. For example, the unit cell 300 may be utilized. The blocks of example process 1200 are described herein as occurring in serial, or linearly (e.g., one after another). However, multiple blocks of example process 1200 may occur in parallel. In addition, the blocks of example process 1200 need not be performed in the order shown and/or one or more of the blocks of example process 1200 need not be performed.

At block 1205, the active unit cells generate outputs in response to an incident scene (e.g., 600) captured by their respective detector (e.g., 505). Each active unit cell may capture a portion of the incident scene. The output of each active unit cell may include, or may be based on, a counter value from a counter circuit (e.g., 530) of the active unit cell when an integration period (e.g., $T_{int}$) has elapsed and a digital output from an ADC (e.g., 584) indicative of a residual voltage when the integration period (e.g., $T_{int}$) has elapsed. At block 1210, the reference unit cells generate outputs. The outputs from the reference unit cells may be indicative of the ambient temperature, and may be independent of the incident scene. In this regard, the reference unit cells may include a detector and a structure that blocks the detector from the incident scene. For discussion purposes, for each active unit cell, the counter value from the counter circuit is an M-bit counter value and the digital output from the ADC is an L-bit value. For each reference unit cell, the counter value from the counter circuit is an N-bit counter value and the digital output from the ADC is an L-bit value.

At block 1215, a combiner circuit (e.g., 586) generates X-bit counter values for the active unit cells, where X=L+M. For each active unit cell, the X-bit counter value may be based on the counter value from the counter circuit and the digital output from the ADC. At block 1220, a combiner circuit generates Y-bit counter values for the active unit cells, where Y=L+N. For each reference unit cell, the Y-bit counter value may be based on the counter value from the counter circuit and the digital output from the ADC.

At block 1225, a processor circuit (e.g., 594) determines a buffer zone (e.g., 745) based on the Y-bit counter values. An example technique for determining the buffer zone is provided with reference to FIG. 13. In some cases, when a buffer zone cannot be determined, the bolometer bias may be reduced to reduce bolometer variability such that a buffer zone forms. At block 1230, the processor circuit identifies a subset of the X-bit counter values based on the buffer zone. At block 1235, the processor circuit identifies a remainder of the X-bit counter values based on the buffer zone. The subset of the X-bit counter values may include the X-bit counter values that are lower than a lower bound of the buffer zone. The remainder of the X-bit counter values may include the remaining X-bit counter values (e.g., those counter values that are not lower than the lower bound of the buffer zone).

At block 1240, the processor circuit adjusts the X-bit counter values in the subset using a predetermined value to obtain adjusted X-bit counter values. The predetermined value may be $2^X$ (counts. For example, the predetermined value may be added to each of the X-bit counter values in the subset. In this regard, the X-bit counter values in the subset may be associated with those counter values that have looped one additional time relative to the X-bit counter values in the remainder.

At block 1245, the processor circuit generates reconstructed image data associated with the incident scene based on the adjusted X-bit counter values associated with the subset and the remainder of the X-bit counter values. The processor circuit may generate an image (e.g., an IR image) based on the reconstructed image data, such as for display to a user. The image may be a representation of the incident scene, with effects associated with looping of the X-bit counter values having been removed.

Figure 13:
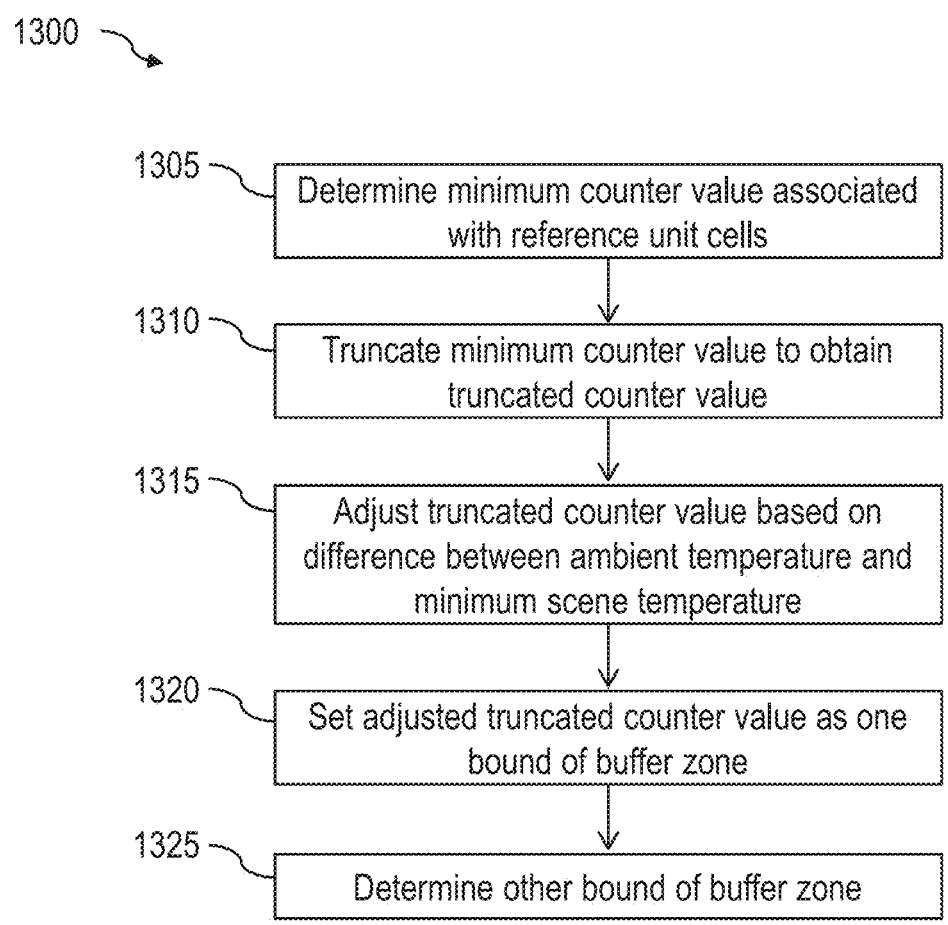
FIG. 13 illustrates a flow diagram of an example process for determining a buffer zone in accordance with an embodiment of the present disclosure.

FIG. 13 illustrates a flow diagram of an example process 1300 for determining a buffer zone in accordance with an embodiment of the present disclosure. For explanatory purposes, the example process 1300 is performed as, or as part of, block 1225 of FIG. 12; however, the example process 1300 is not limited to block 1225 of FIG. 12. For example, the example process 1300 may be utilized with other processes. The blocks of example process 1300 are described herein as occurring in serial, or linearly (e.g., one after another). However, multiple blocks of example process 1300 may occur in parallel. In addition, the blocks of example process 1300 need not be performed in the order shown and/or one or more of the blocks of example process 1300 need not be performed.

At block 1305, a processor circuit (e.g., 594) determines a minimum Y-bit counter value associated with the reference unit cells. The Y-bit counter values may be those generated for the reference unit cells at block 1320 of FIG. 13. At block 1310, the processor circuit truncates the minimum Y-bit counter value to obtain a truncated counter value. To perform the truncation, the processor circuit may remove (Y-X) bits of the minimum Y-bit counter value to obtain an X-bit counter value. The removed (Y-X) bits may be the MSBs of the minimum Y-bit counter value.

At block 1315, the processor circuit adjusts the truncated counter value based on a difference between an ambient temperature (e.g., captured by the reference unit cells) and a minimum scene temperature). For example, when the ambient temperature is higher than the minimum scene temperature, the truncated counter value may be decreased by an offset associated with the difference. In cases that the ambient temperature coincides with the minimum scene temperature, the truncated counter value does not need to be adjusted.

At block 1320, the processor circuit sets the adjusted truncated counter value determined at block 1315 as a first bound of the buffer zone. At block 1325, the processor circuit determines a second bound of the buffer zone. In some cases, the processor circuit may subtract a predetermined value from the first bound to arrive at the second bound. The predetermined value may be a percentage of the dynamic range associated with the X-bit counter values. For example, the predetermined value may be 25% of the dynamic range associated with the X-bit counter values. In this example, when X=20 bits, the predetermined value may be 0.25 $(2^{20})$=262,144.

Figure 14:
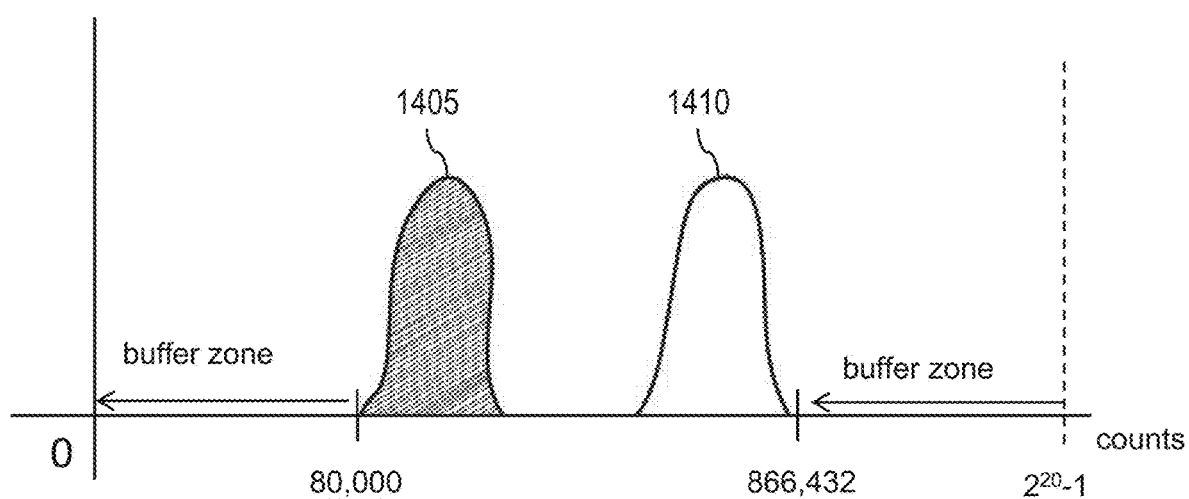
FIG. 14 illustrates an example in which active unit cells loop the same number of times in accordance with an embodiment of the present disclosure.

As an example, FIG. 14 illustrates an example in which the active unit cells (e.g., all the active unit cells) loop the same number of times in accordance with an embodiment of the present disclosure. A distribution 1405 is obtained from the active unit cells that capture a portion of the cold part 605 of the scene 600 and a distribution 1410 is obtained from the active unit cells that capture a portion of the hot part 610 of the scene 600. For example, with reference to FIG. 7, the distributions 1405 and 1410 may be obtained by setting the integration time $T_{int}$ to a time around between $T_{C1}$ and $T_{H2}$, between $T_{C2}$ and $T_{H3}$, or generally any time in which the counter values of the active unit cells that capture the cold part 605 loop the same number of times as the counter values of the active unit cells that capture the hot part 610. Such example times are nominal and need to take into account factors such as detector variability. In FIG. 14, when the first bound of the buffer zone is determined to be at 80,000 counts and the predetermined value is 0.25 $(2^{20})$=262,144, the second bound is 866,432 counts (e.g., 80,000−262,144=−182,144, which loops to −182,144+$2^{20}$=866,432). It is noted that in the example in FIG. 14 the buffer zone is from 80,000 counts looping back to 866,432. The active unit cells loop the same number of times. Thus, at block 1240, none of the active unit cells need an additional $2^{20}$ counts added to their counter values.

Although the foregoing is with reference to a counter that is incremented by one, other manners by which to implement the counter, such as decrementing by one (e.g., starting from a maximum count value), incrementing or decrementing by a predetermined value, and/or other manners in which to generate a counter value indicative of the detector signal provided by the detector.

Although FIGS. 1A, 1B, 2, 3, and 5 provide example architectures in accordance with one or more embodiments of the present disclosure, other architectures may be utilized, which may include additional components, different components, and/or fewer components than those shown in FIGS. 1A, 1B, 2, 3, and 5. In this regard, various types of architectures may be applied to the systems and methods for facilitating pixel readout described herein. For example, the various types of architectures may be implemented in accordance with various techniques as set forth in U.S. Provisional Patent Application No. 62/588,878 filed Nov. 20, 2017 and entitled "PIXEL READOUT WITH COUNTER VALUE LOOPBACK MITIGATION SYSTEMS AND METHODS," U.S. Provisional Patent Application No. 62/446,287 filed Jan. 13, 2017 and entitled "SYSTEMS AND METHODS FOR PIXEL READOUT WITH PARTITIONED ANALOG-TO-DIGITAL CONVERSION," U.S. patent application Ser. No. 14/106,696 filed Dec. 13, 2013 and entitled "SEGMENTED FOCAL PLANE ARRAY ARCHITECTURE," and/or International Patent Application No. PCT/US2015/051798 filed Sep. 23, 2015 and entitled "MODULAR SPLIT-PROCESSING INFRARED IMAGING SYSTEM," all of which are incorporated herein by reference in their entirety.

In one or more embodiments, noise mitigation may be provided for various architectures described herein as well as variations thereof (e.g., additional, different, and/or fewer components than those shown for example in FIGS. 1A, 1B, 2, 3, and 5). In some aspects, the noise may include low-frequency noise, such as flicker noise (e.g., also referred to as 1/f noise). In some cases, in-pixel comparators of unit cells may contribute noise (e.g., flicker noise) to ROICs that include and/or are coupled to the in-pixel comparators and/or ADCs, thus affecting the read out values associated with these ROICs.

As an example, with reference to FIG. 2, the comparator 225 may be an in-pixel comparator. Flicker noise associated with the in-pixel comparator may cause the integration voltage $v_x$ to exceed the reference voltage $V_{REF}$ earlier than in a case that no flicker noise is present, thus causing the in-pixel comparator to generate a control signal to cause the counter value of the counter circuit 230 to increment earlier. In this example, the flicker noise may cause the counter value of the counter circuit 230 to be higher than in the case without the flicker noise.

In an aspect, since the flicker noise is correlated within a frame time, the flicker noise from an in-pixel comparator increases linearly with the digital counter value. Since the flicker noise has a low frequency, the flicker noise may essentially be an offset (e.g., direct current (DC) offset) during a frame. When such an offset (e.g., offset voltage) is present in a comparator, the comparator may fire earlier or later (e.g., depending on a polarity of the offset) relative to a case in which no offset is present. Firing earlier may result in a higher digital output (e.g., counter value) by an end of a frame. Firing later may result in a lower digital output by an end of a frame. An end of a frame may refer to an end of an integration period associated with capturing the frame. In an aspect, absent noise mitigation, as the offset is due to flicker noise, the offset changes over time such that subsequent frames may exhibit an offset different from earlier frames. In some cases, within a single frame, the flicker noise may be considered as an offset for mitigation purposes.

In various aspects described herein, the digital counter value may be adjusted (e.g., incremented by one) each time the integration voltage $v_x$ exceeds the reference voltage $V_{REF}$. In an aspect, the comparator may be referred to as firing when $v_x > V_{REF}$, since a signal output provided (e.g., fired) by the in-pixel comparator when $v_x > V_{REF}$ causes the counter value to be adjusted. As an example, the reference voltage $V_{REF}$ may be between 1.5 V and 2.5 V. Upon firing, the integration voltage $v_x$ may be reset to zero to reset an output of the comparator to an un-fired state. In this regard, each time the comparator fires, the counter value is adjusted and, absent any mitigation, an offset associated with the flicker noise increases. In a case that the counter value is incremented each time the comparator fires, a higher counter value may be associated with higher flicker noise. In some aspects, techniques associated with flicker noise mitigation may also reduce RTN.

In some embodiments, a chopper technique (e.g., also referred to as a switching technique or node-swapping technique) may be utilized to mitigate flicker noise sources, such as those associated with in-pixel comparators. In the chopper technique, input nodes of a comparator may be swapped and output nodes of the comparator may be swapped through control of switching circuits (e.g., including and/or referred to as switches). Such switching circuits may be referred to as collectively forming an input/output switching matrix associated with the in-pixel comparators. Different combinations of on/off states of the switching circuits may be referred to as switching configurations or switching arrangements. In some cases, the switching circuits may be coupled to the comparator and/or provided within the comparator. The chopper technique may allow each pixel to mitigate its respective noise, since comparators of different pixels may fire at different times and thus exhibit different noise.

A control signal generator circuit may be utilized to control these switching circuits. In an aspect, the control signal generator circuit may be, may include, or may be a part of a state machine. The state machine may toggle each time the comparator fires. In some cases, the state machine may utilize, or may be represented by, an LSB of the digital counter value, which toggles (e.g., transitions from 0 to 1 or 1 to 0) after each comparator firing. Thus, in some cases, the LSB may be leveraged to control the switching circuits using little if any additional control circuitry. In an aspect, level-shifting circuitry and/or buffer circuitry may be utilized on the LSB of the digital counter value before controlling the switches (e.g., to provide an appropriate control voltage level based on whether the LSB is represented as a 0 or a 1). In some cases, such circuitry may be utilized for timing purposes, such as to ensure the comparator stays in reset for a sufficient amount of time after the input-output switching matrix has toggled from one switching configuration to another switching configuration to allow the various nodes in the new switching configuration to settle before integration starts again. After reset, the comparator transistors from a fired state to an un-fired state. As an example, depending on application, the amount of time to facilitate reset may be in the tens of microseconds or the tens of nanoseconds.

In a case that the input nodes are not swapped and the output nodes are not swapped, if an offset (e.g., offset voltage) is present on a comparator's positive input node where an integration (INT) node is connected, the offset may cause the comparator to fire earlier than in a case with no offset. Such offset may accumulate over time and cause a higher digital counter value by an end of a frame. As an example, utilizing the chopper technique, if a positive offset is present on the comparator's positive input node, during a first firing of the comparator, the comparator may fire earlier due to a positive input on the comparator's positive input node. After the first firing of the comparator, the input nodes are swapped such that the comparator's positive input node becomes the comparator's negative input node, and vice versa. With the positive offset on the negative terminal, for a second firing of the comparator, the comparator fires slightly later due to the offset. By firing early due to the offset in the first comparator firing and later in the second comparator firing, after two firings the offset has been mitigated (e.g., reduced or eliminated), rather than summed in a case without swapping. Such a cycle may repeat with every two comparator firings. For a case with an odd number of comparator firings, an offset associated with a single, non-compensated offset is generally small, relative to a case that such offset is repeatedly summed with each comparator firing.

Figure 15A:
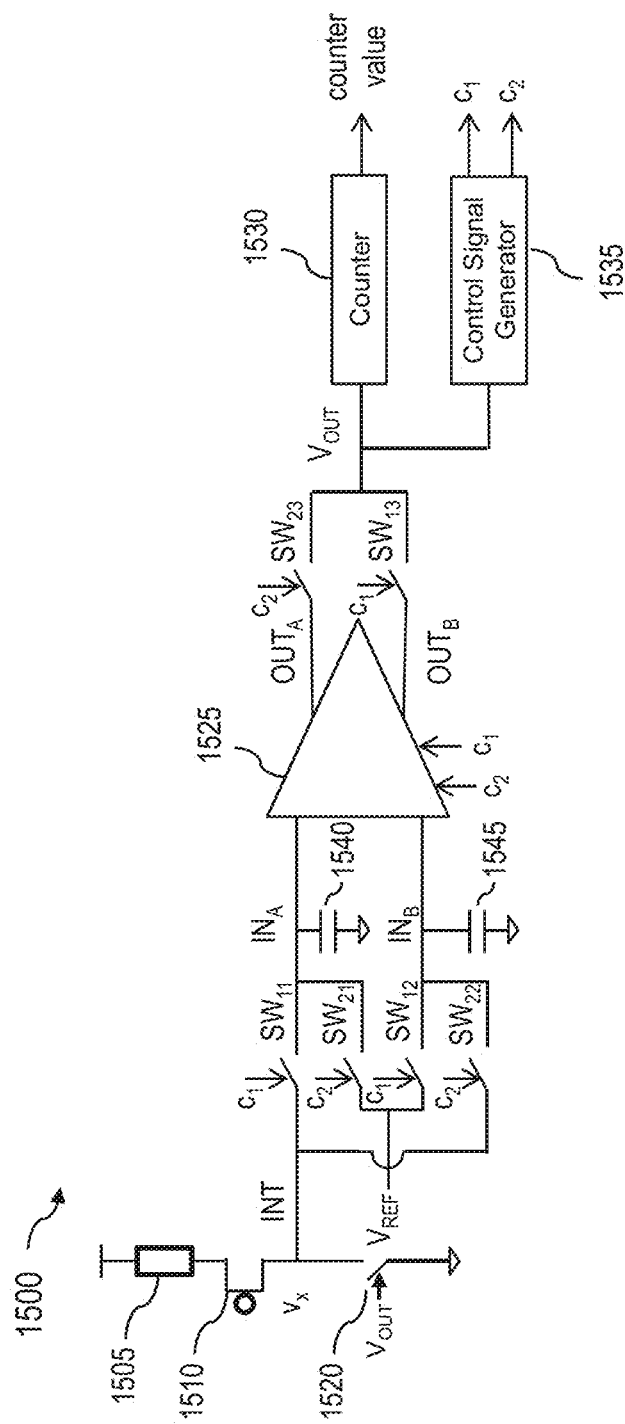
FIGS. 15A, 15B, and 16 illustrate examples of a unit cell in accordance with one or more embodiments of the present disclosure.

FIG. 15A illustrates an example of a unit cell 1500 in accordance with an embodiment of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The unit cell 1500 includes a detector 1505, capacitors 1540 and 1545, a transistor 1510, a switching circuit 1520, a comparator 1525, a counter circuit 1530, a control signal generator circuit 1535, and switching circuits $SW_{11}$, $SW_{12}$, $SW_{21}$, $SW_{22}$, $SW_{31}$, and $SW_{32}$. In an embodiment, the detector 1505, transistor 1510, switching circuit 1520, comparator 1525, and counter circuit 1530 may be, may include, or may be a part of the detector 205, transistor 210, capacitor 215, switch 220, comparator 225, and counter circuit 230, respectively, of FIG. 2. In some cases, the counter circuit 1530 and the control signal generator circuit 1535 may be a single circuit. For example, an LSB of the counter value of the counter circuit 1530 may be utilized to provide the control signals $c_1$ and $c_2$.

In some aspects, combination of on and off state of the switching circuits shown in FIG. 15A may provide switching configurations. In this regard, the control signal generator circuit 1535 may generate control signals $c_1$ and $c_2$ to control the various switching circuits to set the unit cell 1500 in a first switching configuration or a second switching configuration, and transition between these switching configurations. In the first switching configuration, the switches $SW_{11}$, $SW_{12}$, and $SW_{13}$ are closed (e.g., on) and the switches $SW_{21}$, $SW_{22}$, and $SW_{23}$ are open (e.g., off). An $IN_A$ node (tied to the capacitor 1540) is coupled to the detector 1505 via the switch $SW_{11}$, an $IN_B$ node is tied to reference voltage $V_{REF}$ via the switch $SW_{22}$, and an $OUT_B$ node is coupled to the counter circuit 1530 via the switch $SW_{13}$. In this regard, a detector signal from the detector 1505 may be provided to and integrated by the capacitor 1540 and the reference voltage $V_{REF}$ may be provided to the capacitor 1545. When the integration voltage on the $IN_A$ node exceeds the reference voltage $V_{REF}$ on the $IN_B$ node, the comparator 1525 provides one or more control signals onto the $OUT_B$ node to cause the counter value of the counter circuit 1530 to increment (e.g., the comparator 1525 fires).

In the second switching configuration, the switches $SW_{21}$, $SW_{22}$, and $SW_{23}$ are closed (e.g., on) and the switches $SW_{11}$, $SW_{12}$, and $SW_{13}$ are open (e.g., off). The $IN_A$ node is tied to the reference voltage $V_{REF}$ via the switch $SW_{21}$, the $IN_B$ node is coupled to the detector 1505 via the switch $SW_{22}$, and the $OUT_A$ node is coupled to the counter circuit 1530 via the switch $SW_{23}$. In this regard, a detector signal from the detector 1505 may be provided to the capacitor 1545 and the reference voltage $V_{REF}$ may be provided to the capacitor 1540. When a voltage on the $IN_B$ node exceeds the reference voltage $V_{REF}$ on the $IN_A$ node, the comparator 1525 provides one or more control signals onto the $OUT_A$ node to cause the counter value of the counter circuit 1530 to increment. In some cases, the comparator 1525 may include one or more switches (e.g., controllable using the control signals $c_1$ and $c_2$). Each time the comparator 1525 fires, the switching circuit 1520 closes (e.g., in response to voltage $V_{OUT}$ from the comparator 1525) to cause reset (e.g., reset to 0 V) of the capacitor 1540 or 1545 tied to the INT node.

In some cases, $c_1$ is logic high (e.g., 1) and $c_2$ is logic low (e.g., 0) during the first switching configuration, and $c_1$ is logic low (e.g., 0) and $c_2$ is logic high (e.g., 1) during the second switching configuration. In this regard, each switching circuit may include one or more switches that can be turned on or off based on logic levels (e.g., logic low, logic high) of corresponding switch control signals. In this regard, the switching circuit may include gate drivers that are responsive to logic levels (e.g., states, values) of the switch control signals, and generate appropriate voltages to drive (e.g., turn on, turn off) the switching circuit in response to the switch control signals. Although for explanatory purposes a switching circuit turns on in response to a logic high control signal and turns off in response to a logic low signal, depending on type of switching technology utilized a switching circuit may turn off in response to a logic high control signal and turn on in response to a logic low control signal.

Figure 15B:
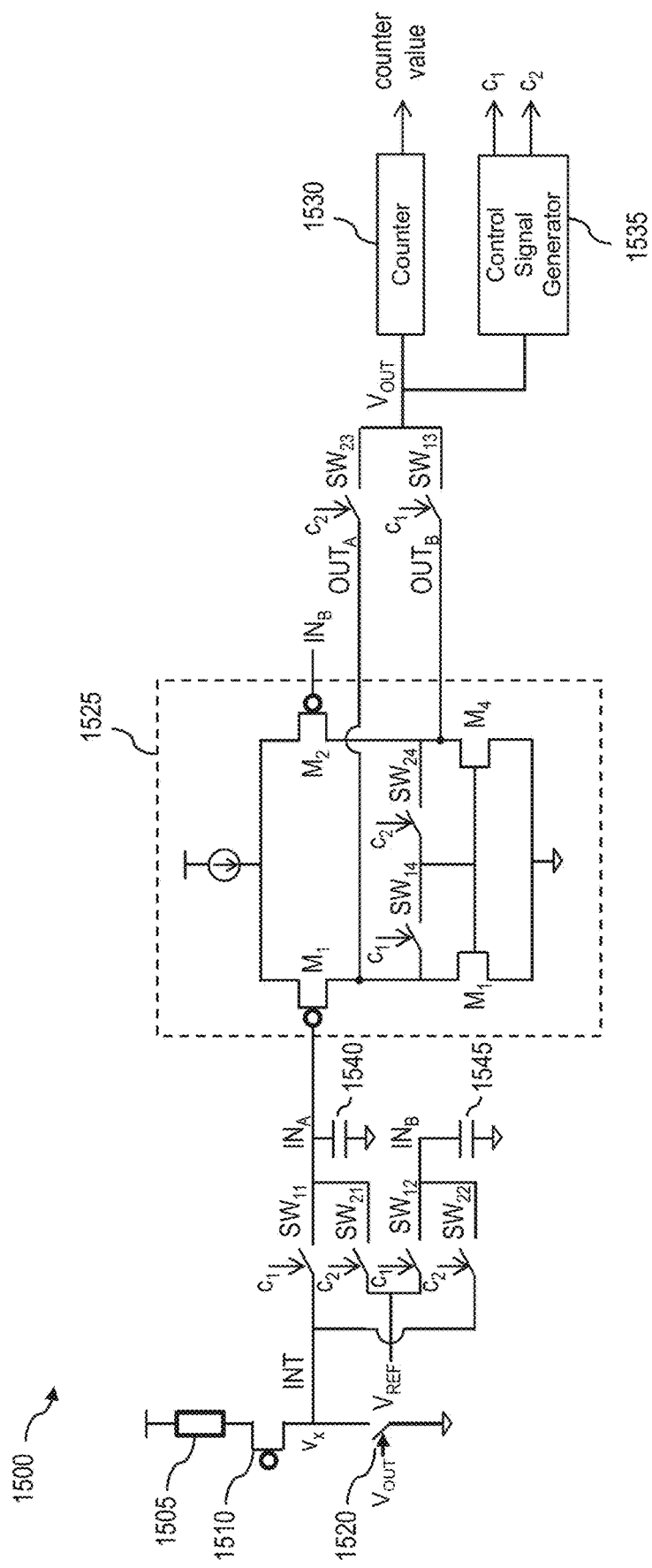

FIG. 15B illustrates an example of the comparator 1525 of FIG. 15A along with other components of the unit cell 1500 in accordance with an embodiment of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. The description of FIG. 15A generally applies to FIG. 15B, with examples of differences between FIGS. 15A and 15B and other description provided for clarity.

In an aspect, as shown in FIG. 15B, the control signals $c_1$ and $c_2$ may configure the comparator 1525 in addition to the switching circuits external to the comparator 1525. The comparator 1525 may include transistors M1, M2, M3, and M4 and switching circuits $SW_{14}$ and $SW_{24}$. In an aspect, the transistors M1 and M2 may be PMOS transistors and the transistors M3 and M4 may be NMOS transistors. The transistor M1 (e.g., its gate) is tied to the $IN_A$ node, transistor M2 (e.g., its gate) is tied to the $IN_B$ node, transistor M3 (e.g., its drain) is connected to the $OUT_A$ node, and transistor M4 (e.g., its drain) is tied to the $OUT_B$ node.

In the first switching configuration, the switching circuits $SW_{11}$, $SW_{12}$, $SW_{13}$, and $SW_{14}$ are closed (e.g., on) and the switching circuits $SW_{21}$, $SW_{22}$, $SW_{23}$, and $SW_{24}$ are open (e.g., off). The transistor M3 has its drain and gate connected via the switch $SW_{14}$, thus setting the transistor M1 (tied to $IN_A$) as a positive input (e.g., positive input node) of the comparator 1525 and $OUT_B$ as an output (e.g., negative output) of the comparator 1525. The transistor M2 (tied to $IN_B$) is set as a negative input of the comparator 1525.

In the second switching configuration, the switching circuits $SW_{21}$, $SW_{22}$, $SW_{23}$, and $SW_{24}$ are closed (e.g., on) and the switching circuits $SW_{11}$, $SW_{12}$, $SW_{13}$, and $SW_{14}$ are open (e.g., off). The transistor M4 has its drain and gate connected via the switch $SW_{24}$, thus setting the transistor M2 (tied to $IN_B$) as the positive input of the comparator 1525 and $OUT_A$ as the output (e.g., negative output) of the comparator 1525. The transistor M1 (tied to $IN_A$) is set as the negative input of the comparator 1525.

In the first switching configuration, noise sources associated with the transistors M1 and M3 may impact (e.g., contribute noise to) the positive input of the comparator 1525, and, in the second switching configuration, these same noise sources associated with the transistors M1 and M3 may impact the negative input of the comparator 1525. Similarly, in the first switching configuration, noise sources associated with the transistors M2 and M4 may impact the negative input of the comparator 1525 and, in the second switching configuration, these same noise sources associated with the transistors M2 and M4 may impact the positive input of the comparator 1525. The offset (e.g., due to noise) may be mitigated due to swapping the input nodes $IN_A$ and $IN_B$ and switching the output nodes $OUT_A$ and $OUT_B$.

Figure 16:
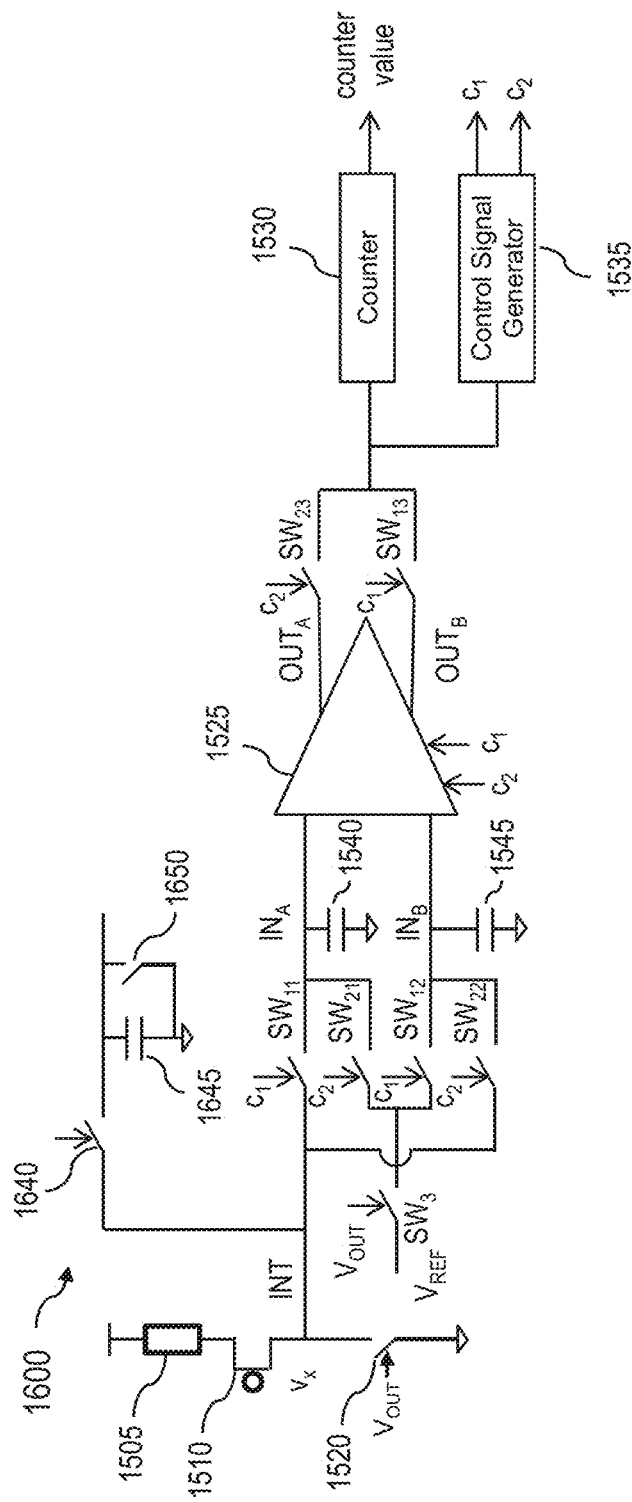

Although not shown in FIGS. 15A and 15B, in some cases, the unit cell 1500 may include circuitry to facilitate reading of a residue voltage and/or sampling of the voltage reference. As an example, FIG. 16 illustrates an example of a unit cell 1600 in accordance with an embodiment of the present disclosure. The description of FIGS. 2, 15A, and 15B generally applies to FIG. 16, with examples of differences and other description provided for clarity. The unit cell 1600 includes the components of the unit cell 1500. In addition, the unit cell includes a switching circuit 1640, capacitor 1645, and switching circuit 1650, which may collectively form sample, hold, and reset circuitry. The sample, hold, and reset circuitry may be utilized to provide the residual voltage associated with the capacitor 1540 (e.g., when the $IN_A$ node is tied to the INT node) or the capacitor 1545 (e.g., when the $IN_B$ node is tied to the INT node) at the end of the integration period. The switching circuit 1640 may be closed at the end of a frame (e.g., end of an integration frame). In an embodiment, the switching circuit 1640, capacitor 1645, and switching circuit 1650 may be the switch 240, capacitor 245, and switch 250, respectively. A switching circuit $SW_3$ controlled by the $V_{OUT}$ of the comparator 1525 may be utilized to sample the reference voltage $V_{REF}$ to the capacitor 1540 or 1545 (e.g., rather than continuously driving the reference voltage $V_{REF}$). Although the switching circuits are depicted as single switches in FIGS. 15A, 15B, and 16, each of the switching circuits may include a single switch or multiple switches (e.g., serially connected switches).

Figure 17:
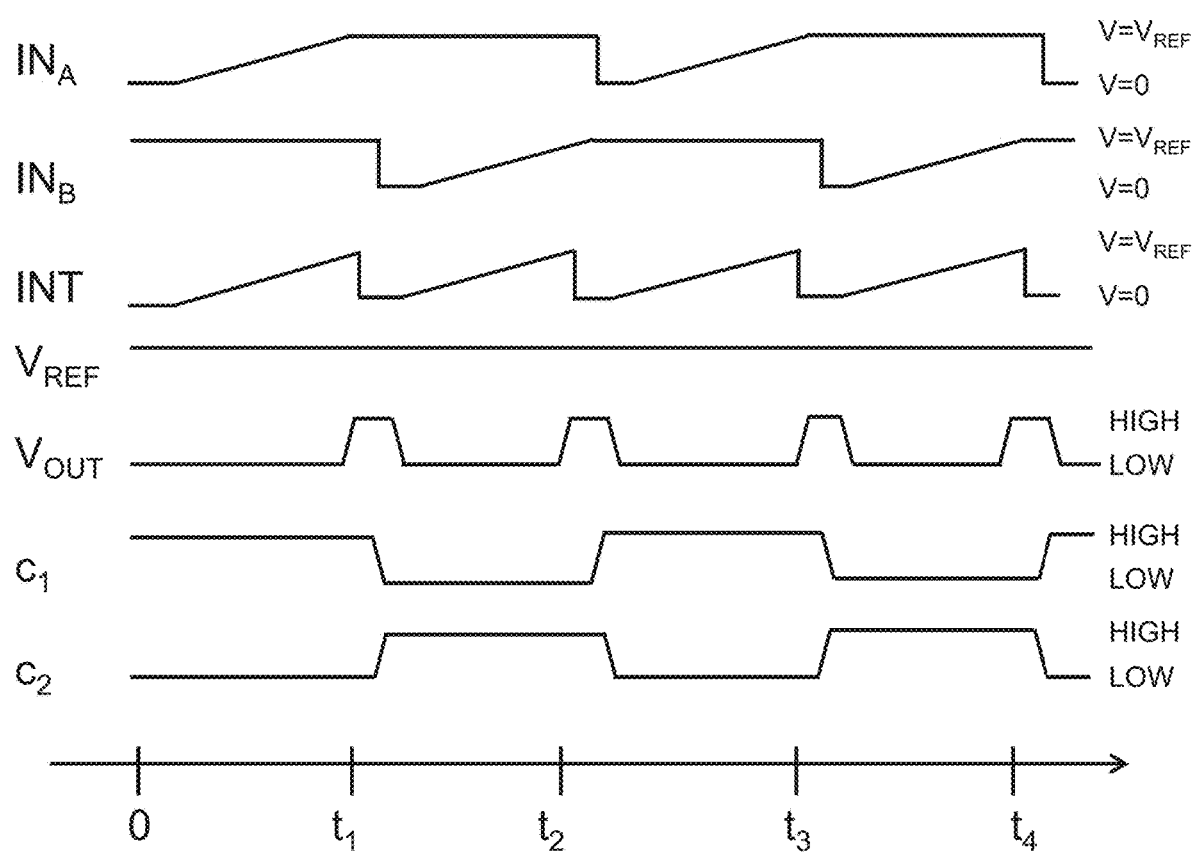
FIG. 17 illustrates a timing diagram of voltage levels at various nodes and of various signals of a unit cell in accordance with an embodiment of the present disclosure.

FIG. 17 illustrates a timing diagram of voltage levels at various nodes of a unit cell (e.g., 1500, 1600) in accordance with an embodiment of the present disclosure. At time t=0, the unit cell starts in the first switching configuration where the $IN_A$ node tracks the INT node. When the INT node reaches the level of the reference voltage $V_{REF}$, the comparator (e.g., 1525) of the unit cell fires as the $V_{OUT}$ node goes high (e.g., is driven to a logic high). In response, the counter value of the counter circuit (e.g., 1530) is updated (e.g., incremented) and the configuration transitions (e.g., toggles) from the first switching configuration to the second switching configuration. After the transition, the INT node is reset. Since the $IN_B$ node is connected to the INT node in the second switching configuration, the $IN_B$ is reset. The $IN_A$ node is tied to the reference voltage $V_{REF}$. It is noted that the $IN_A$ node is at or near the reference voltage $VR_{REF}$ when the comparator fired, since the comparator fired at or near the time at which the $IN_A$ node exceeds the reference voltage $V_{REF}$. In FIG. 17, the comparator fires at t=$t_1$, $t_2$, $t_3$, and $t_4$. Timing associated with the various signals, such as $V_{OUT}$, $c_1$, and $c_2$ are appropriate to allow time for voltages to settle before integration begins again. In an aspect, it is noted that references herein to a node may refer to the node itself and/or a voltage at the node. For example, $V_{OUT}$ may refer to the $V_{OUT}$ node and/or the voltage $V_{OUT}$ on the $V_{OUT}$ node.

In some embodiments, an auto-zero reset technique may be utilized to mitigate flicker noise sources, such as those associated with in-pixel comparators. During reset, the comparator transitions from a fired state (e.g., to cause the counter value to increment) to an un-fired state (e.g., to reset and perform integration). The auto-zero reset technique may allow each pixel to mitigate its respective noise, since comparators of different pixels may fire at different times and thus exhibit different noise. In some aspects, the auto-zero reset technique may be utilized alone or together with one or more other noise mitigation techniques, such as the chopper technique, and vice versa.

Figure 18:
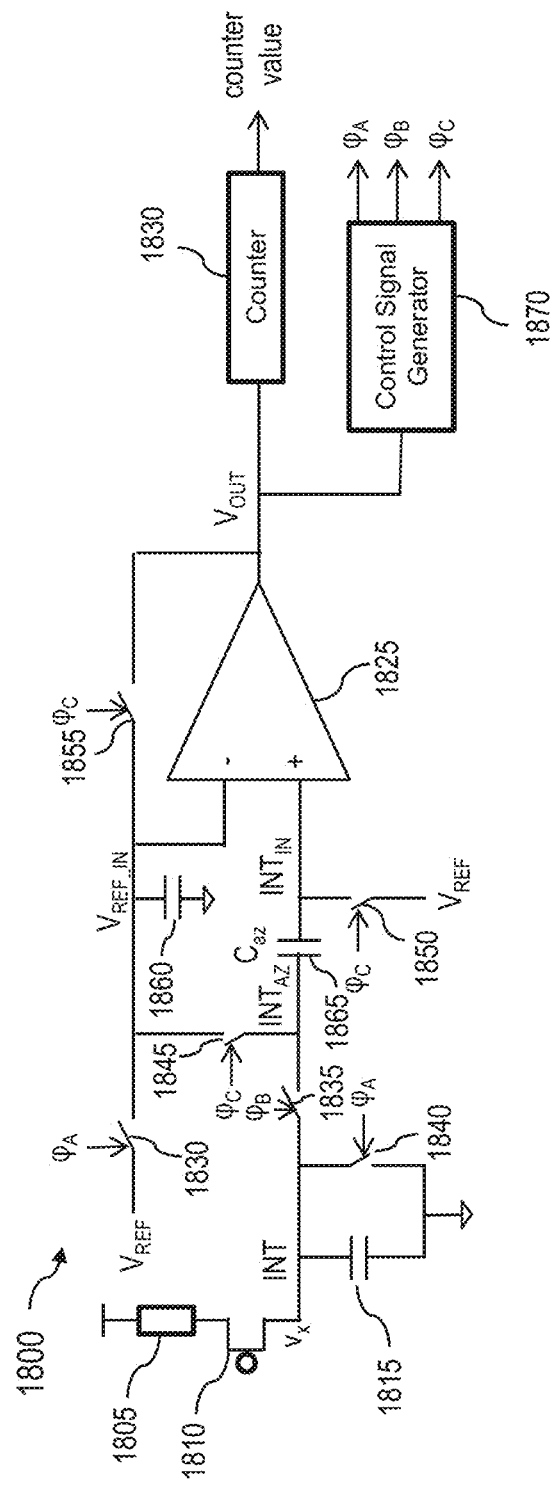
FIG. 18 illustrates an example of a circuit for facilitating noise mitigation in accordance with an embodiment of the present disclosure.

FIG. 18 illustrates an example of a circuit 1800 for facilitating noise mitigation in accordance with an embodiment of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The circuit 1800 includes a detector 1805, a transistor 1810, capacitors 1815, 1860, and 1865, a comparator 1825, and a counter circuit 1830. The circuit 1800 also includes switching circuits 1830, 1835, 1840, 1845, 1850, and 1855 and a control signal generator circuit 1870 that generates control signals to operate (e.g., turn on, turn off) the switching circuits 1830, 1835, 1840, 1845, 1850, and 1855. In an embodiment, the detector 1805, transistor 1810, capacitor 1815, comparator 1825, and counter circuit 1830 may be, may include, or may be a part of the detector 205, transistor 210, capacitor 215, comparator 225, and counter circuit 230, respectively, of FIG. 2.

In an aspect, the architecture may be referred to as a self-reset auto-zero architecture. In this architecture, the comparator 1825 may be referred to as a self-reset auto-zero comparator. Although the comparator 1825 is a non-inverting comparator, other types of comparators such as an inverting comparator or a differential auto-zero comparator may be used. Although the switching circuits are depicted as a single switch in FIG. 18, each of the switch circuits may include a single switch or multiple switches (e.g., serially connected switches).

In some embodiments, during the integration period, the circuit 1800 may use the capacitor 1815 to operate in an integration mode to integrate the detector signal and operate in a reset mode to reset the capacitor 1815 (e.g., and other associated circuitry) when the comparator 1825 fires. The reset mode is performed to facilitate a next integration mode of the circuit 1800. In these embodiments, during the integration period, the circuit 1800 transitions between the integration mode and the reset mode. In FIG. 18, the circuit 1800 may transition between the integration and reset modes and perform actions associated with these modes based at least on control signals $\varphi_A$, $\varphi_B$, and $\varphi_C$ (e.g., also referred to as clock signals, self-auto-zero reset clocks, or simply clocks) from the control signal generator circuit 1870. In some embodiments, the circuit 1800 may include circuitry that, at the end of the integration period, receives a residual voltage of the capacitor 1815 to facilitate read out of the residual voltage.

Figure 19:
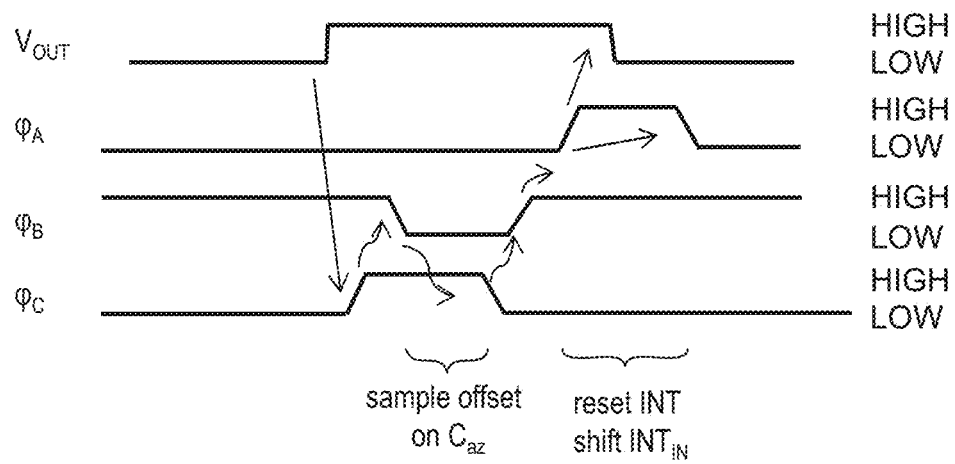
FIG. 19 illustrates an example of a timing diagram associated with operation of the circuit of FIG. 18 in accordance with an embodiment of the present disclosure.
Figure 20A:
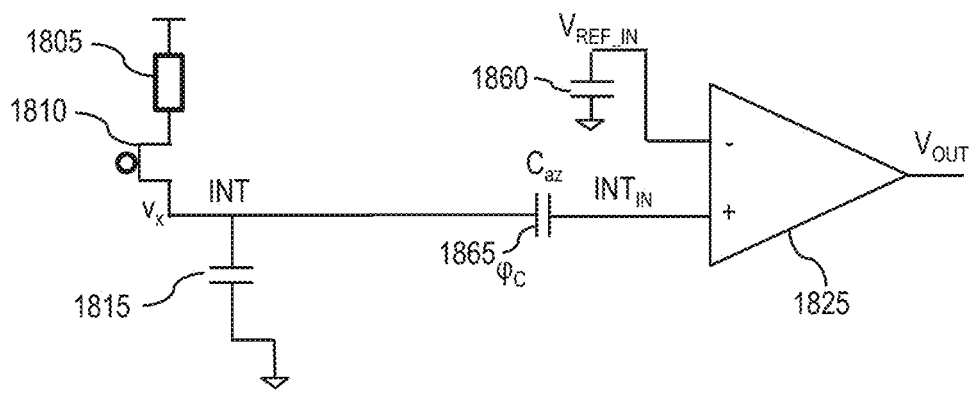
FIGS. 20A through 20D illustrate operation the circuit of FIG. 18 in accordance with an embodiment of the present disclosure.
Figure 20B:
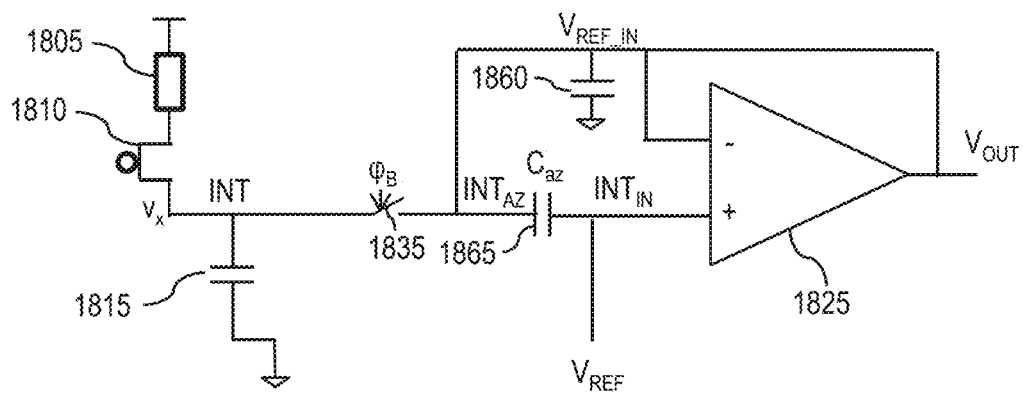
Figure 20C:
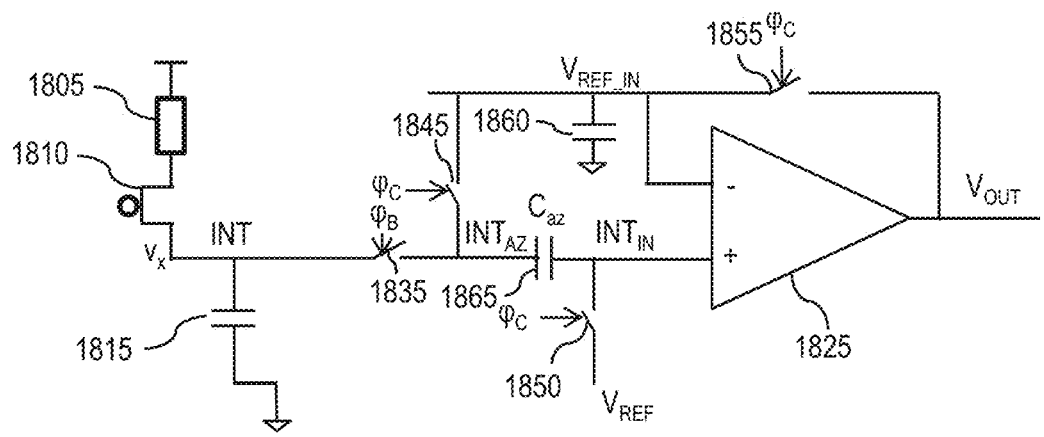
Figure 20D:
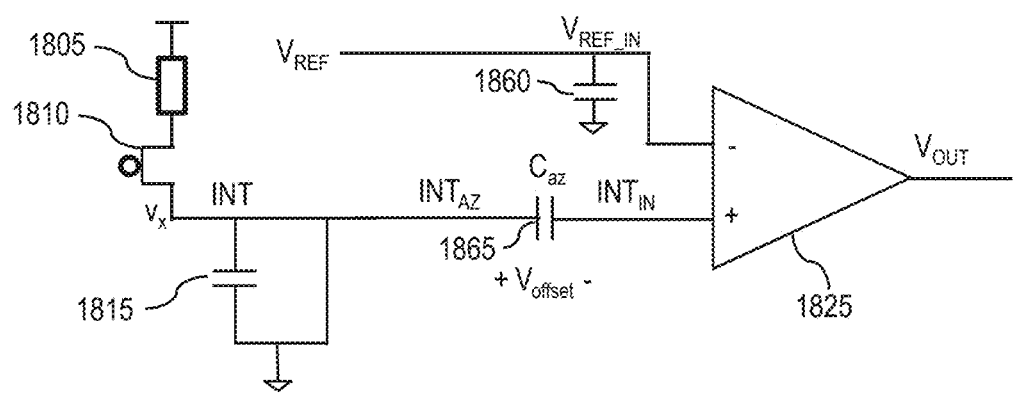

FIG. 19 illustrates an example of a timing diagram of the output $V_{OUT}$ of the comparator 1825 and the control signals $\varphi_A$, $\varphi_B$, and $\varphi_C$ of the control signal generator circuit 1870 of FIG. 18, in accordance with an embodiment of the present disclosure. FIGS. 20A through 20D illustrate operation of the circuit 1800 in accordance with an embodiment of the present disclosure. For explanatory purposes, the operation of the circuit 1800 is based on the timing diagram shown in FIG. 19, although different timing diagrams may be utilized. In an aspect, FIG. 20A illustrates operation of the circuit 1800 in an integration mode, and FIGS. 20B-20D illustrate operation of the circuit 1800 in a reset mode.

In FIG. 20A, the circuit 1800 is operating in the integration mode, with the control signals $\varphi_A$=0 (e.g., logic low), $\varphi_B$=1 (e.g., logic high), and $\varphi_C$=0 (e.g., logic low). The capacitor 1860 holds a value of the reference voltage $V_{REF}$ at a $V_{REF\_IN}$ node (e.g., the reference voltage $V_{REF}$ is sampled onto the capacitor 1860). With reference to FIGS. 18 and 20A, the switching circuit 1835 is closed (e.g., turned on by $\varphi_B=1$) and the switching circuits 1830, 1840, 1845, 1850, and 1855 are open (e.g., turned off by $\varphi_A=0$ or $\varphi_C=0$). With this switching configuration, the capacitor 1815 (tied to the INT node) is coupled to the capacitor 1865 (tied to the $INT_{IN}$ node). As the capacitor 1815 integrates, the integration voltage $v_X$ on the INT node increases. Since the NT node is coupled to the $INT_{IN}$ node, a voltage on the $INT_{IN}$ node increases together with the voltage $v_x$ as the capacitor 1815 integrates. When the voltage on the $INT_{IN}$ node exceeds the reference voltage $V_{REF}$ (e.g., held on the capacitor 1860 at the $V_{REF\_IN}$ node), the comparator 1825 drives its output voltage $V_{OUT}$ to a logic high state (e.g., also referred to as the comparator 1825 firing). The counter circuit 1830 and the control signal generator circuit 1870 receive the comparator output voltage $V_{OUT}$.

With $V_{OUT}$ in the logic high state, the counter circuit 1830 increments its counter value and the control signal generator circuit 1870 generates appropriate values for the control signals $\varphi_A$, $\varphi_B$, and $\varphi_C$ in response to receiving the voltage $V_{OUT}$. The control signals $\varphi_A$, $\varphi_B$, and $\varphi_C$ are set to values to cause the circuit 1800 to transition from the integration mode to the reset mode. It is noted that, although not explicitly shown, the voltage $V_{OUT}$ in FIG. 20A couples to the counter circuit 1830 and the control signal generator circuit 1870 as shown in FIG. 18.

In an embodiment, the reset mode includes a series of events (e.g., operations) to effectuate an auto-zero reset. In an aspect, as shown in FIG. 19, when the voltage $V_{OUT}$ is driven to logic high, $\varphi_C$ going high (e.g., driven to logic high, turned on) followed by $\varphi_B$ going low (e.g., driven to logic low, turned off). In this aspect, as shown in FIG. 19, the control signals $\varphi_B$ and $\varphi_C$ can be non-overlapping as (pc turns off. In another aspect, the order in which $\varphi_C$ goes high and $\varphi_B$ goes low may be reversed.

In FIG. 20B, the circuit 1800 is operating in the reset mode, with the control signals $\varphi_A=0$, $\varphi_B=0$, and $\varphi_C=1$. For example, the circuit 1800 enters a first state in a series of states associated with the reset mode. In this first event, an offset $V_{offset}$ (e.g., associated with flicker noise) is sampled onto the capacitor 1865. With reference to FIGS. 18 and 20A, the switching circuits 1850 and 1855 are closed (e.g., turned on by $\varphi_C=1$) and the switching circuits 1830, 1835, 1840, and 1845 are open (e.g., turned off by $\varphi_A=0$ or $\varphi_B=0$).

With the switching circuit 1850 closed, the reference voltage $V_{REF}$ drives the $INT_{IN}$ node. With the switching circuit 1855 closed, the comparator output $V_{OUT}$ is tied to the VREF_IN node to provide feedback. In some cases, such feedback is a unity-gain feedback and the comparator 1825 may be referred to as being in a unity-gain feedback mode. The feedback may cause driving of the reference voltage $V_{REF}$ plus an offset $V_{offset}$ onto the $V_{OUT}$, $V_{REF\_IN}$, and $INT_{AZ}$ nodes. This may set a voltage of the offset across the capacitor 1865 such that the capacitor 1865 captures the offset. In some cases, prior to proceeding to the next event, timing associated with transitioning the control signals $\varphi_A$, $\varphi_B$, and/or $\varphi_C$ to different values may be controlled to allow the various signals (e.g., voltages at the various nodes such as the $V_{OUT}$, $V_{REF\_IN}$, and $INT_{AZ}$ nodes) to settle. Such timing may be based on comparator bandwidth (e.g., in unity gain).

In FIG. 20C, the circuit 1800 continues to a second state associated with the reset mode when the control signal $\varphi_C$ falls. In this second state, the control signals $\varphi_A=0$, $\varphi_B=0$, and $\varphi_C=0$. The switching circuits 1830, 1835, 1840, 1845, 1850, and 1855 are open. The reference voltage $V_{REF}$ plus the offset is captured on (e.g., sampled onto) the $INT_{AZ}$ node and the reference voltage $V_{REF}$ is captured on (e.g., sampled onto) the $INT_{IN}$ node. With $V_{REF}+V_{offset}$ at the $INT_{AZ}$ node and $V_{REF}$ at the $INT_{IN}$ node, the offset $V_{offset}$ is captured across the capacitor 1865. In an aspect, the offset captured across the capacitor 1865 may be utilized to mitigate (e.g., cancel out) the offset associated with the comparator 1825.

In FIG. 20D, the circuit 1800 continues to a third state associated with the reset mode when the control signal $\varphi_B$ returns high and $\varphi_A$ goes high. In this third state, the control signals $\varphi_A=1$, $\varphi_B=1$, and $\varphi_C=0$. With reference to FIGS. 18 and 20D, the switching circuits 1830, 1835, and 1840 are closed and the switching circuits 1845, 1850, and 1855 are open. The INT node and the $INT_{AZ}$ nodes are driven to 0 V, thus causing the $INT_{IN}$ node to accordingly be driven near 0 V. During this third state, the $V_{REF\_IN}$ node is driven to the reference voltage $V_{REF}$ rather than $V_{REF}+V_{offset}$. The offset voltage $V_{offset}$ remains captured across the capacitor 1865 to allow mitigation of the offset present in the comparator 1825. In an aspect, the control signals $\varphi_A=1$, $\varphi_B=1$, and $\varphi_C=0$ may be maintained to allow the duration of this third state to be sufficient to reset (e.g., completely reset) the INT node. When the control signals $\varphi_A$ drops low, the circuit 1800 transitions from the reset mode to the integration mode, with the control signals $\varphi_A=0$, $\varphi_B=1$, and $\varphi_C=0$. The integration mode is described with respect to FIG. 20A.

Figure 21:
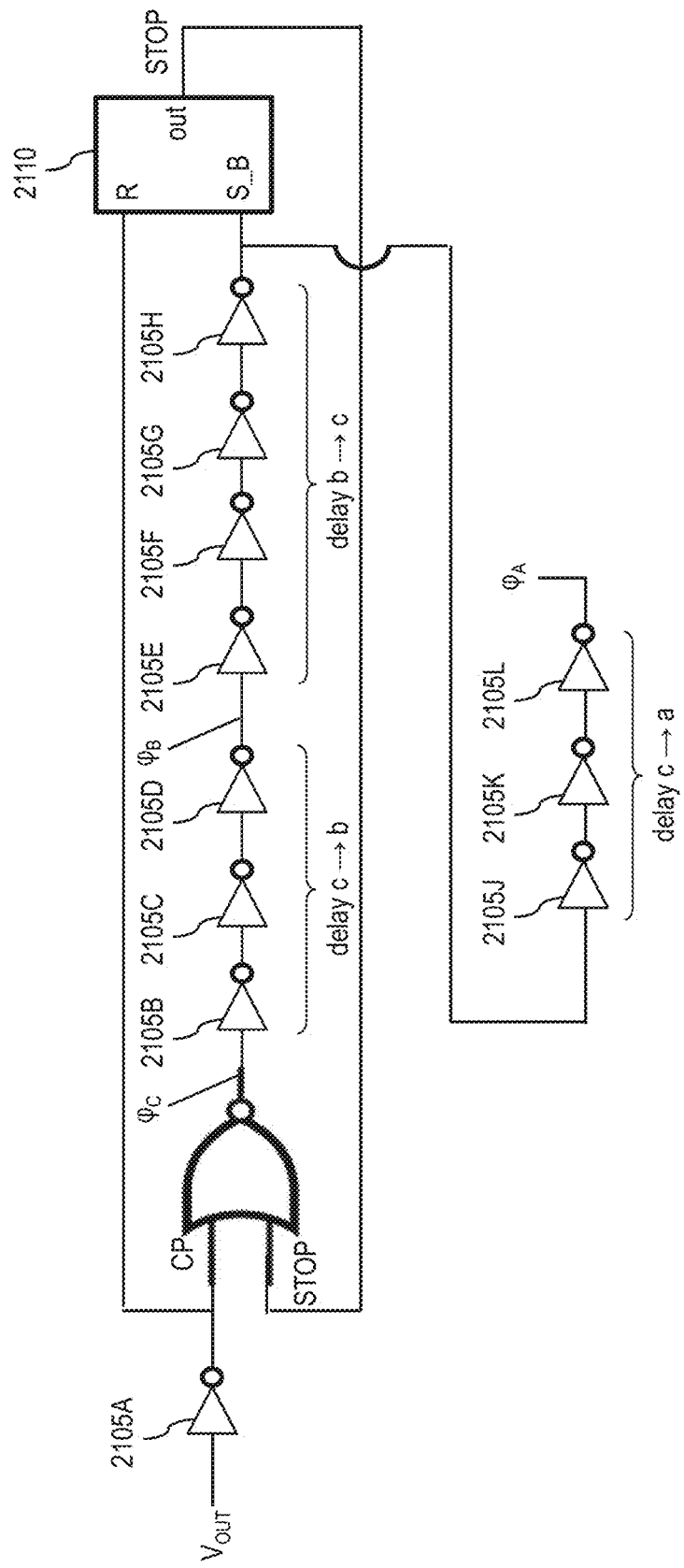
FIG. 21 illustrates an example of a control signal generator circuit in accordance with an embodiment of the present disclosure.

FIG. 21 illustrates an example of a control signal generator circuit 2100 in accordance with an embodiment of the present disclosure. In an embodiment, the control signal generator circuit 2100 may be, may include, or may be a part of the control signal generator circuit 1870 of FIGS. 18 and 20A-20D.

The control signal generator circuit 2100 includes inverters 2105A-L, SR-latch 2110, and a NOR gate 2115. When the voltage $V_{OUT}$ goes high, the inverter 2105A inverts the voltage $V_{OUT}$ to drive a signal (e.g., voltage signal) CP low. As the signal CP started high and is tied to a reset input of the SR-latch 2110, a signal STOP provided by the SR-latch 2110 is low. With the signal STOP low and the signal CP transitioning from high to low, an output of the NOR gate 2115 transitions from low to high and can be utilized as the control signal (pc. The control signal $\varphi_C$ may be provided as an input to the inverter 2105B. After a delay implemented using the inverters 2105B-D, an output of the inverter 2105D can be utilized as the control signal $\varphi_B$.

A delay implemented using the inverters 2105E-H. In an aspect, with reference to FIG. 20B, the delay implemented using the inverters 2105E-H may allow the control signals $\varphi_B$ and $\varphi_C$ to maintain their relative states (e.g., to maintain the state shown in FIG. 20B) long enough to settle the values (e.g., voltage values) on the various nodes and capture the offset on the capacitor 1865. An output of the inverter 2105H is provided to a set input of the SR-latch 2110 to set the signal STOP. The signal STOP feeds back to the NOR gate 2115 and causes first $\varphi_C$ and then $\varphi_B$ to transition back to their respective original states. The output of the inverter 2105H is also provided to the inverter 2105J. A delay implemented using the inverters 2105J-L may cause the control signal $\varphi_A$ to turn on after $\varphi_C$ has returned back to its original state. The control signal $\varphi_A$ may stay on for the same or around the same amount of time that $\varphi_B$ and $\varphi_C$ stay on. This amount of time may be set by a delay through a loop (e.g., from a time that the signal CP transitions to logic high to a time that the signal CP transitions to logic low).

Although the foregoing describes an example in which three control signals $\varphi_A$, $\varphi_B$, and $\varphi_C$ are utilized to implement auto-zero, self-reset, and noise mitigation capability, in some embodiments fewer, more, and/or different control signals may be utilized. With regard to the control signal generator circuit 2100, other manners by which to delay and/or generate control signals may be utilized.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A device, comprising:
a detector configured to detect electromagnetic radiation associated with an incident scene and generate a detection signal based on the detected electromagnetic radiation;
a first capacitor coupled to the detector, wherein the first capacitor is configured to, during an integration period, accumulate a first voltage based on the detection signal;
a comparator configured to, during the integration period, compare the first voltage with a reference voltage to determine whether the first voltage exceeds the reference voltage;
a first switch configured to couple the detector to a first input node of the comparator in a first switching configuration of the device;
a second switch configured to couple the detector to a second input node of the comparator when in a second switching configuration of the device;
a counter circuit coupled to the first capacitor, wherein the counter circuit is configured to, during the integration period, adjust a counter value based on a comparison of the first voltage with the reference voltage, wherein the counter circuit is coupled to the first capacitor and the first input node of the comparator;
a first reset circuit coupled to the first capacitor, wherein the first reset circuit is configured to, during the integration period, reset the first capacitor based on the comparison; and
a processing circuit configured to generate a digital detector output based at least on the counter value when the integration period has elapsed.

2. The device of claim 1, further comprising:
a second capacitor configured to receive a residual voltage on the first capacitor when the integration period has elapsed, wherein the processing circuit is configured to generate the digital detector output based on at least on the counter value and the residual voltage.

3. The device of claim 2, further comprising:
a sample/hold circuit configured to hold the residual voltage when the integration period has elapsed and at least partially concurrently with a second voltage being accumulated by the first capacitor, wherein the sample/hold circuit comprises the second capacitor and a switch; and
a second reset circuit coupled to the second capacitor and configured to reset the second capacitor when the residual voltage is read out to at least one of an analog bus or a buffer,
wherein:
the device comprises an infrared imaging device configured to capture an infrared image associated with the incident scene,
the digital detector output comprises a first plurality of bits indicative of the counter value and a second plurality of bits indicative of a digitized representation of the residual voltage, and
the digital detector output is associated with at least one pixel of the infrared image.

4. A device, comprising:
a detector configured to detect electromagnetic radiation associated with an incident scene and generate a detection signal based on the detected electromagnetic radiation;
a first capacitor coupled to the detector, wherein the first capacitor is configured to, during an integration period, accumulate a first voltage based on the detection signal;
a counter circuit coupled to the first capacitor, wherein the counter circuit is configured to, during the integration period, adjust a counter value based on a comparison of the first voltage with a reference voltage;
a comparator configured to, during the integration period, compare the first voltage at a first input node of the comparator with the reference voltage at a second input node of the comparator to determine whether the first voltage exceeds the reference voltage, wherein the comparator is coupled to the first capacitor and the counter circuit;
a second capacitor coupled to the comparator;
a control signal generator circuit configured to generate a plurality of control signals;
a first switch configured to selectively couple the first capacitor to the second capacitor based on a first control signal from the control signal generator circuit;
a first reset circuit coupled to the first capacitor, wherein the first reset circuit is configured to, during the integration period, reset the first capacitor based on the comparison and in response to a second control signal from the control signal generator circuit;
a second switch configured to selectively couple the second input node to the second capacitor based on a third control signal from the control signal generator circuit;
a third switch configured to selectively couple a node at the reference voltage to the first input node based on the third control signal; and a processing circuit configured to generate a digital detector output based at least on the counter value when the integration period has elapsed.

5. The device of claim 4, further comprising:
wherein the comparator is configured to:
  receive the first voltage at the first input node of the comparator;
  receive the reference voltage at the second input node of the comparator; and
  provide a comparator output signal via an output node of the comparator;
the device further comprising:
  a fourth switch configured to selectively couple the output node of the comparator to the second input node of the comparator based on the third control signal,
wherein:
  the comparator is in a unity-gain feedback mode when the output node and the second input node are coupled via the fourth switch, and
  the second capacitor is configured to capture an offset voltage associated with the comparator when the first switch is open, the second switch is closed, the third switch is closed, and the fourth switch is closed.

6. The device of claim 1, further comprising:
a second capacitor coupled to the second input node of the comparator;
a control signal generator circuit configured to generate a control signal in response to each adjustment of the counter value to cause transitioning between the first switching configuration and the second switching configuration; and
wherein during the integration period:
  when in the first switching configuration, the first capacitor is configured to accumulate the first voltage based on the detection signal; and
  when in the second switching configuration, the second capacitor is configured to accumulate the first voltage based on the detection signal.

7. The device of claim 6, further comprising:
a first transistor coupled to the first capacitor;
a second transistor coupled to the second capacitor;
a third transistor connected to the first transistor;
a fourth transistor connected to the second transistor and third transistor;
a first comparator switch configured to couple a drain of the third transistor to a gate of the third transistor when in the first switching configuration;
a second comparator switch configured to couple a drain of the fourth transistor to a gate of the fourth transistor when in the second switching configuration;
a third switch configured to couple a node at the reference voltage to the first input node when in the second switching configuration;
a fourth switch configured to couple a node at the reference voltage to the second input node when in the first switching configuration;
a fifth switch configured to couple the fourth transistor to the counter circuit when in the first switching configuration; and
a sixth switch configured to couple the third transistor to the counter circuit when in the second switching configuration,
wherein:
  a gate of the first transistor is coupled to the first capacitor,
  a gate of the second transistor is coupled to the second capacitor,
  the drain of the third transistor is connected to a drain of the first transistor,
  the drain of the fourth transistor is connected to a drain of the second transistor, and
  the gate of the third transistor is connected to the gate of the fourth transistor.

8. The device of claim 1, wherein the processing circuit is further configured to:
adjust the counter value using a predetermined value to obtain an adjusted counter value; and
generate reconstructed image data associated with the incident scene based at least on the adjusted counter value.

9. A device, comprising:
a detector configured to detect electromagnetic radiation associated with an incident scene and generate a detection signal based on the detected electromagnetic radiation;
a first capacitor coupled to the detector, wherein the first capacitor is configured to, during an integration period, accumulate a first voltage based on the detection signal;
a counter circuit coupled to the first capacitor, wherein the counter circuit is configured to, during the integration period, adjust a counter value based on a comparison of the first voltage with a reference voltage;
a first reset circuit coupled to the first capacitor, wherein the first reset circuit is configured to, during the integration period, reset the first capacitor based on the comparison;
a plurality of active unit cells, wherein each of the plurality of active unit cells comprises an active unit cell detector configured to generate an output in response to the incident scene;
a plurality of reference unit cells, wherein each of the plurality of reference unit cells comprises a reference unit cell detector configured to generate an output; and
a the processing circuit is configured to:
  generate a digital detector output based at least on the counter value when the integration period has elapsed;
  adjust the counter value using a predetermined value to obtain an adjusted counter value;
  generate reconstructed image data associated with the incident scene based at least on the adjusted counter value;
  generate, for each of the plurality of active unit cells, a respective first counter value based on the respective output associated with the active unit cell;
  generate, for each of the plurality of reference unit cells, a respective second counter value based on the respective output associated with the reference unit cell;
  determine a buffer zone based on the second counter values;
  identify, based on the buffer zone, a subset of the first counter values;
  identify a remainder of the first counter values; and
  adjust each of the first counter values in the subset using the predetermined value to obtain adjusted first counter values.

10. The device of claim 9, wherein:
the first counter values are first X-bit counter values and the second counter values are Y-bit counter values,
Y is greater than X, and
the processing circuit is further configured to:
  determine a minimum Y-bit counter value among the Y-bit counter values; and
  remove (Y-X) bits of the minimum Y-bit counter value to obtain an X-bit counter value associated with the Y-bit counter value, wherein the buffer zone is based on the X-bit counter value associated with the Y-bit counter value, and wherein the first counter values in the subset each have a value less than a lower bound of the buffer zone.

11. The device of claim 9, wherein:
the detector is the active unit cell detector of one of the plurality of active unit cells,
each of the plurality of reference unit cells further comprises a structure configured to block the incident scene from the reference unit cell detector of the reference unit cell,
the processing circuit is configured to generate the reconstructed image data associated with the incident scene based at least on the adjusted first counter values and the remainder of the first counter values;
the detector comprises a bolometer;
the one of the plurality of active unit cells further comprises:
  the counter circuit;
  the first capacitor; and
  a second capacitor configured to receive a residual voltage on the first capacitor when the integration period has elapsed;
the output of the one of the plurality of active unit cells is based on the counter value and the residual voltage;
the plurality of active unit cells form at least a portion of a focal plane array;
a first wafer comprises the first capacitor and the second capacitor of the one of the plurality of active unit cells;
a second wafer comprises the counter circuit of the one of the plurality of active unit cells;
the device comprises an infrared imaging device configured to capture an infrared image associated with the incident scene; and
the digital detector output is associated with at least one pixel of the infrared image.

12. A method, comprising:
during an integration period:
  accumulating, by a first capacitor, a first voltage based on electromagnetic radiation received by a detector, wherein the electromagnetic radiation is associated with an incident scene;
  comparing, by a comparator, the first voltage to a reference voltage;
  adjusting, by a counter circuit, a counter value using a predetermined value to obtain an adjusted counter value when the first voltage exceeds the reference voltage;
  resetting the first voltage when the first voltage exceeds the reference voltage; and
  repeating the accumulating, comparing, adjusting, and resetting until the integration period has elapsed; and
generating a digital detector output based on the counter value when the integration period has elapsed; and
generating reconstructed image data associated with the incident scene based at least on the adjusted counter value.

13. The method of claim 12, further comprising:
determining a residual voltage on the first capacitor when the integration period has elapsed;
maintaining the residual voltage on a second capacitor;
accumulating, by the first capacitor during a second integration period, a second voltage based on second electromagnetic radiation received by the detector;
receiving a readout signal; and
providing the residual voltage to an analog bus and/or a buffer in response to the readout signal,
wherein:
  the accumulating the first voltage comprises integrating a detector signal from the detector to accumulate the first voltage,
  the second voltage is accumulated at least partially concurrently with the residual voltage being maintained on the second capacitor,
  the residual voltage is maintained on the second capacitor at least until the residual voltage is provided, and
  the digital detector output is based on the counter value when the integration period has elapsed and the residual voltage when the integration period has elapsed.

14. The method of claim 12, further comprising:
capturing, by a second capacitor coupled to the comparator, an offset voltage associated with the comparator;
generating, by a control signal generator circuit, a first control signal and a second control signal in response to the adjusting;
opening, based on the first control signal, a first switch to decouple the first capacitor from the second capacitor; and
closing, based on the second control signal, a second switch to couple a node at the reference voltage to the comparator, a third switch to couple a node at the reference voltage to the second capacitor, and a fourth switch to couple an output node of the comparator to an input node of the comparator,
wherein:
  the second capacitor captures the offset voltage when the first switch is open, the second switch is closed, the third switch is closed, and the fourth switch is closed, and
  the comparator is in a unity-gain feedback mode when the output node and the input node are coupled via the fourth switch.

15. The method of claim 12, wherein the first capacitor is coupled to a first input node of the comparator, wherein a second capacitor is coupled to a second input node of the comparator, the method further comprising:
coupling the detector to the first input node when in a first switching configuration;
coupling the detector to the second input node when in a second switching configuration;
transitioning between the first switching configuration and the second switching configuration in response to the adjusting,
wherein the first capacitor accumulates the first voltage when in the first switching configuration and the second capacitor accumulates the first voltage when in the second switching configuration;
generating a comparator output signal when the first voltage exceeds the reference voltage, wherein the adjusting is in response to the comparator output signal;
when in the first switching configuration:
  decoupling the detector from the second input node;

coupling the reference voltage to the second input node;
coupling a first output node to the counter circuit; and
providing the comparator output signal to the counter circuit via the first output node of the comparator; and when in the second switching configuration:
decoupling the detector from the first input node;
coupling the reference voltage to the first input node;
coupling a second output node to the counter circuit when in the second switching configuration; and
providing the comparator output signal via the second output node of the comparator.

16. The method of claim 12, further comprising:
generating a respective first counter value for each of a plurality of active unit cells in response to the incident scene;
generating a respective second counter value for each of a plurality of reference unit cells;
determining a buffer zone based on the second counter values;
identifying a subset of the first counter values based on the buffer zone;
identifying a remainder of the first counter values; and
adjusting each of the first counter values in the subset using the predetermined value to obtain the adjusted first counter values.

17. The method of claim 16, wherein:
each of the plurality of active unit cells comprises an active unit cell detector that captures at least a portion of the incident scene,
each of the plurality of reference unit cells comprises a reference unit cell detector and a structure that blocks the incident scene from the reference unit cell detector,
the detector is the active unit cell detector of one of the plurality of active unit cells,
a bound of the buffer zone is based on a minimum counter value among the second counter values, and
the reconstructed image data associated with the incident scene is further based on the remainder of the first counter values.

18. The method of claim 17, wherein:
the first counter values are first X-bit counter values and the second counter values are Y-bit counter values,
Y is greater than X,
the first X-bit counter values have a maximum counter value of $2^X-1$,
the first X-bit counter values loop back to 0 when incremented from the maximum counter value;
determining a minimum Y-bit counter value among the Y-bit counter values;
removing (Y-X) bits of the minimum Y-bit counter value to obtain an X-bit counter value associated with the minimum Y-bit counter value,
wherein the buffer zone is based on the X-bit counter value associated with the minimum Y-bit counter value;
adjusting the X-bit counter value associated with the minimum Y-bit counter value based on a difference between an ambient temperature and a minimum scene temperature to obtain an adjusted X-bit counter value,
wherein:
a lower bound of the buffer zone is based on the adjusted X-bit counter value,
the first counter values in the subset each have a value less than the lower bound of the buffer zone,
the (Y-X) bits of the minimum Y-bit counter value that are removed are least significant bits of the minimum Y-bit counter value,
the predetermined value is $2^X$, and
the adjusting comprises adding the predetermined value to each of the first counter values in the subset.

19. The method of claim 16, further comprising:
determining an offset value based on the second counter values; and
generating a respective compensated counter value for each of the plurality of active unit cells based on the offset value and the respective first counter value,
wherein:
the adjusting comprises adjusting each of the compensated counter values associated with the first counter values in the subset to obtain adjusted compensated counter values, and
the reconstructed image data is based at least on the adjusted compensated counter values and the compensated counter values associated with the remainder.

20. The method of claim 12, further comprising:
determining a residual voltage on the first capacitor when the integration period has elapsed;
maintaining the residual voltage on a second capacitor; and
accumulating, by the first capacitor during a second integration period, a second voltage based on second electromagnetic radiation received by the detector at least partially concurrently with the residual voltage being maintained on the second capacitor.

* * * * *

UNITED STATES PATENT AND TRADEMARK OFFICE
CERTIFICATE OF CORRECTION

PATENT NO. : 11,044,422 B2
APPLICATION NO. : 16/505260
DATED : June 22, 2021
INVENTOR(S) : Simolon et al.

Page 1 of 1

It is certified that error appears in the above-identified patent and that said Letters Patent is hereby corrected as shown below:

In the Specification

In Column 5, Line 19, change "indicative of; a time" to --indicative of, a time--.

In Column 26, Line 25, change "(counts" to --counts--.

In Column 27, Line 22, change "(counts" to --counts--.

In Column 28, Line 65, change "patent application Ser. No." to --Patent Application No.--.

In the Claims

In Claim 9, Column 40, Line 44, change "a the processing circuit" to --a processing circuit--.

Signed and Sealed this
Fourteenth Day of September, 2021

Drew Hirshfeld
*Performing the Functions and Duties of the
Under Secretary of Commerce for Intellectual Property and
Director of the United States Patent and Trademark Office*